(12) United States Patent
Paul

(10) Patent No.: US 11,017,164 B1
(45) Date of Patent: May 25, 2021

(54) SYSTEMS AND METHODS FOR COLLECTING MULTIPLE FORMS OF DIGITAL CONTENT USING A SINGLE LANDING SCREEN

(71) Applicant: Facebook, Inc., Menlo Park, CA (US)

(72) Inventor: Debashish Paul, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/112,815

(22) Filed: Aug. 27, 2018

(51) Int. Cl.
  *H04L 12/58* (2006.01)
  *G06F 3/0482* (2013.01)
  *G06F 40/174* (2020.01)

(52) U.S. Cl.
  CPC .......... *G06F 40/174* (2020.01); *G06F 3/0482* (2013.01); *H04L 51/32* (2013.01)

(58) Field of Classification Search
  None
  See application file for complete search history.

(56) References Cited

U.S. PATENT DOCUMENTS

| | | |
|---|---|---|
| D341,848 S | 11/1993 | Bigelow et al. |
| 6,167,406 A | 12/2000 | Hoskins et al. |
| D437,342 S | 2/2001 | Kramer et al. |
| D663,314 S | 7/2012 | David et al. |
| 8,554,875 B1 | 10/2013 | Alfaro et al. |
| D701,228 S | 3/2014 | Lee |
| D727,339 S | 4/2015 | Lee |
| 9,118,723 B1 | 8/2015 | Su et al. |
| D741,897 S | 10/2015 | Wilkinson et al. |
| D743,999 S | 11/2015 | Villamor et al. |
| 9,251,124 B2 | 2/2016 | Steinfl et al. |
| D753,703 S | 4/2016 | Villamor et al. |
| D764,511 S | 8/2016 | Han et al. |
| D768,668 S | 10/2016 | Anzures et al. |
| D768,688 S | 10/2016 | Chow-Quan |
| D771,644 S | 11/2016 | Jewitt et al. |
| D772,906 S | 11/2016 | Fu |
| D776,692 S | 1/2017 | Armstrong |
| 9,639,969 B1 * | 5/2017 | Wilson ............ G06T 11/60 |
| D789,389 S | 6/2017 | Kim et al. |
| D789,956 S | 6/2017 | Ortega et al. |

(Continued)

OTHER PUBLICATIONS

"Welcome to Kanazawa", URL: https://web.archive.org/web/20150407020335/http://www.ishikawakintetsu.co.jp/howto_en.html, Apr. 7, 2015, 2 pages.

(Continued)

*Primary Examiner* — Henry Orr
(74) *Attorney, Agent, or Firm* — FisherBroyles, LLP

(57) ABSTRACT

Systems and methods for collecting multiple forms of digital content using a single landing screen may include (1) receiving, via a social media application installed on a user device, user input that triggers a composition creation process, (2) providing, via a display element of the user device, a composition landing screen with multiple landing spaces (e.g., a media space, a text space, and a metadata space), (3) receiving, from the composition landing screen, user content submitted to one or more of the landing spaces, and (4) creating a social media composition based at least in part on the user content received from the composition landing screen. Various other methods, systems, and computer-readable media are also disclosed.

20 Claims, 16 Drawing Sheets

(56) References Cited

U.S. PATENT DOCUMENTS

| | | | |
|---|---|---|---|
| D803,257 S | 11/2017 | Graham et al. | |
| 9,911,300 B2 | 3/2018 | Herbst et al. | |
| D822,689 S | 7/2018 | Amidei et al. | |
| D823,871 S | 7/2018 | Verdu Orts et al. | |
| D831,059 S | 10/2018 | Bao | |
| 10,126,927 B1* | 11/2018 | Fieldman | G06F 3/147 |
| D837,240 S | 1/2019 | Van Tricht | |
| D838,732 S | 1/2019 | Furdei et al. | |
| D838,741 S | 1/2019 | Tijerina et al. | |
| D841,024 S | 2/2019 | Clediere et al. | |
| D842,871 S | 3/2019 | Clediere et al. | |
| 10,263,802 B2 | 4/2019 | Burns et al. | |
| D852,213 S | 6/2019 | Clediere et al. | |
| D852,215 S | 6/2019 | Westerhold et al. | |
| D852,832 S | 7/2019 | Westerhold et al. | |
| D859,442 S | 9/2019 | Zhang et al. | |
| D861,715 S | 10/2019 | Haile et al. | |
| D890,198 S | 7/2020 | Paul | |
| D894,921 S | 9/2020 | Paul | |
| 2003/0179223 A1 | 9/2003 | Ying et al. | |
| 2005/0114374 A1 | 5/2005 | Juszkiewicz et al. | |
| 2009/0125588 A1 | 5/2009 | Black et al. | |
| 2010/0153886 A1 | 6/2010 | Hautala | |
| 2010/0257490 A1 | 10/2010 | Lyon et al. | |
| 2011/0050975 A1* | 3/2011 | Chung | H04M 1/0241 348/333.02 |
| 2011/0087994 A1 | 4/2011 | Swink et al. | |
| 2011/0264582 A1 | 10/2011 | Kim et al. | |
| 2012/0308209 A1* | 12/2012 | Zaletel | G11B 31/006 386/278 |
| 2012/0323930 A1 | 12/2012 | Kennberg et al. | |
| 2013/0111395 A1 | 5/2013 | Ying et al. | |
| 2013/0124634 A1 | 5/2013 | Weinstein et al. | |
| 2013/0332831 A1 | 12/2013 | Birnkrant et al. | |
| 2013/0332850 A1 | 12/2013 | Bovet et al. | |
| 2014/0040775 A1* | 2/2014 | Stoop | H04L 65/403 715/753 |
| 2014/0089833 A1 | 3/2014 | Hwang et al. | |
| 2014/0129627 A1* | 5/2014 | Baldwin | H04L 67/306 709/204 |
| 2014/0181010 A1 | 6/2014 | Imbruce et al. | |
| 2014/0189608 A1 | 7/2014 | Shuttleworth et al. | |
| 2014/0237055 A1 | 8/2014 | Burrell et al. | |
| 2014/0244621 A1* | 8/2014 | Lindsay | G06F 16/335 707/722 |
| 2014/0244622 A1* | 8/2014 | Lindsay | G06F 17/276 707/722 |
| 2014/0280629 A1* | 9/2014 | Rubinstein | H04L 51/32 709/206 |
| 2014/0282077 A1* | 9/2014 | Wilson | G06F 3/0482 715/751 |
| 2015/0012525 A1* | 1/2015 | Lindsay | G06F 16/24578 707/722 |
| 2015/0020170 A1 | 1/2015 | Talley | |
| 2015/0106731 A1 | 4/2015 | Matas et al. | |
| 2015/0134603 A1 | 5/2015 | Melamed et al. | |
| 2015/0149967 A1 | 5/2015 | Bernstein et al. | |
| 2015/0199770 A1* | 7/2015 | Wallenstein | G06Q 50/01 705/26.2 |
| 2015/0286371 A1 | 10/2015 | Degani | |
| 2015/0312184 A1* | 10/2015 | Langholz | H04L 51/04 715/753 |
| 2016/0006679 A1 | 1/2016 | Williams et al. | |
| 2016/0011758 A1 | 1/2016 | Dornbush et al. | |
| 2016/0092064 A1* | 3/2016 | Wu | G06F 3/0482 715/789 |
| 2016/0119751 A1 | 4/2016 | Park et al. | |
| 2016/0132200 A1* | 5/2016 | Walkin | G06F 3/0488 715/752 |
| 2016/0149843 A1 | 5/2016 | Spicer et al. | |
| 2016/0219057 A1* | 7/2016 | Das | H04L 63/101 |
| 2017/0127128 A1* | 5/2017 | Seger | H04N 21/44213 |
| 2017/0149714 A1 | 5/2017 | Valdivia et al. | |
| 2017/0337747 A1 | 11/2017 | Hull | |
| 2018/0121065 A1 | 5/2018 | Seo et al. | |
| 2018/0183738 A1 | 6/2018 | Parnell | |
| 2018/0191797 A1* | 7/2018 | Javier | H04L 67/2804 |
| 2018/0191962 A1* | 7/2018 | Javier | G06F 16/44 |
| 2019/0200051 A1 | 6/2019 | Paul et al. | |

OTHER PUBLICATIONS

Non-Final Office Action for U.S. Appl. No. 16/122,838 dated Oct. 16, 2019, 15 pages.

Final Office Action for U.S. Appl. No. 16/122,838 dated Dec. 16, 2019, 17 pages.

Paul, Debashish, "Systems and Methods for Creating Multiple Renditions of a Social Media Composition from Inputs to a Single Digital Composer", U.S. Appl. No. 16/122,826 dated Sep. 5, 2018, 67 pages.

Paul, Debashish, "Systems and Methods for Creating Interactive Metadata Elements in Social Media Compositions", U.S. Appl. No. 16/114,157 dated Aug. 27, 2018, 58 pages.

Non-Final Office Action for U.S. Appl. No. 29/660,463 dated Oct. 22, 2019, 11 pages.

Ong, Thuy, ""Facebook rolls out GIF-supported polls feature to web and mobile apps"", URL: https://www.theverge.com/2017/11/3/16602592/facebook-polls-feature-web-ios-android-apps, Nov. 3, 2017, pp. 1-2.

Notice of Allowance for U.S. Appl. No. 29/660,463 dated Feb. 6, 2020, 37 pages.

Nesterov, Anatoly, "7 Types of Animations for Your Mobile App", URL: https://web.archive.org/web/20160315010906/https://yalantis.com/blog/-seven-types-of-animations-for-mobile-apps, Mar. 15, 2016, pp. 1-15.

Non-Final Office Action for U.S. Appl. No. 29/660,466 dated Oct. 23, 2019, 9 pages.

Ex Parte Quayle Action for U.S. Appl. No. 29/660,466 dated Feb. 10, 2020, 19 pages.

Arpost, "The AR City App from Blippar promises better-than-GPS navigation thanks to augmented reality", URL: arpost.co/2017/11/17 far-city-augmented-reality-navigation, Nov. 17, 2017, 2 pages.

Non-Final Office Action for U.S. Appl. No. 16/122,838 dated Mar. 6, 2020, 17 pages.

Final Office Action for U.S. Appl. No. 16/122,838 dated May 26, 2020, 30 pages.

Preinterview First Office Action for U.S. Appl. No. 16/122,826 dated Mar. 3, 2020, 30 pages.

First Action Interview for U.S. Appl. No. 16/122,826 dated Mar. 25, 2020, 15 pages.

Preinterview First Office Action for U.S. Appl. No. 16/114,157 dated Mar. 30, 2020, 32 pages.

Paul, Debashish, "Display Screen with Graphical User interface", U.S. Appl. No. 29/732,572, filed Apr. 24, 2020, 14 pages.

Notice of Allowance for U.S. Appl. No. 29/660,466 dated Apr. 29, 2020, 20 pages.

Final Office Action for U.S. Appl. No. 16/122,826 dated Jul. 9, 2020, 30 pages.

Final Office Action for U.S. Appl. No. 16/114,157 dated Sep. 1, 2020, 92 pages.

Non-Final Office Action for U.S. Appl. No. 16/122,826 dated Oct. 28, 2020, 47 pages.

Notice of Allowance for U.S. Appl. No. 16/114,157 dated Nov. 23, 2020, 96 pages.

* cited by examiner

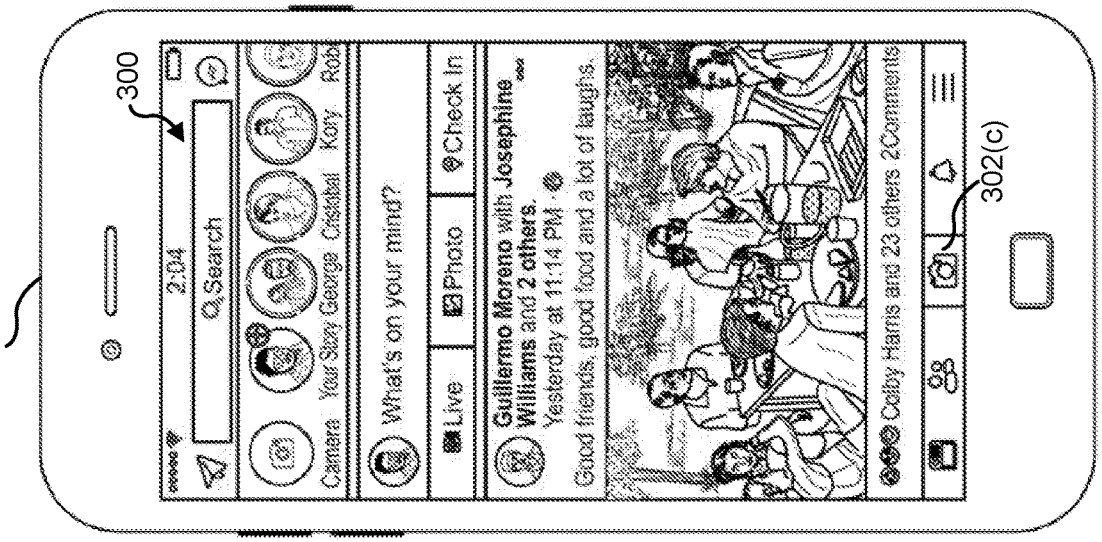
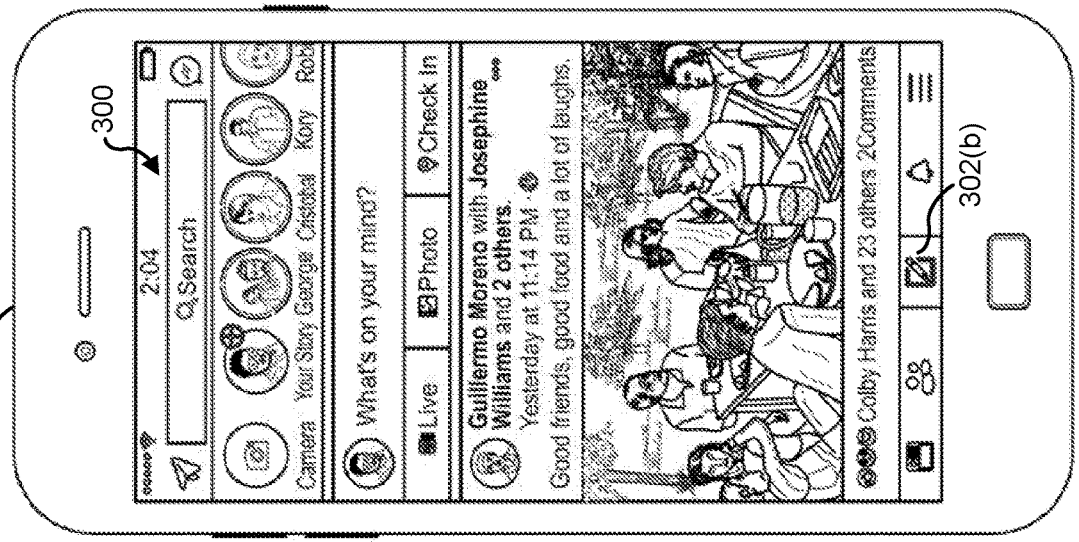
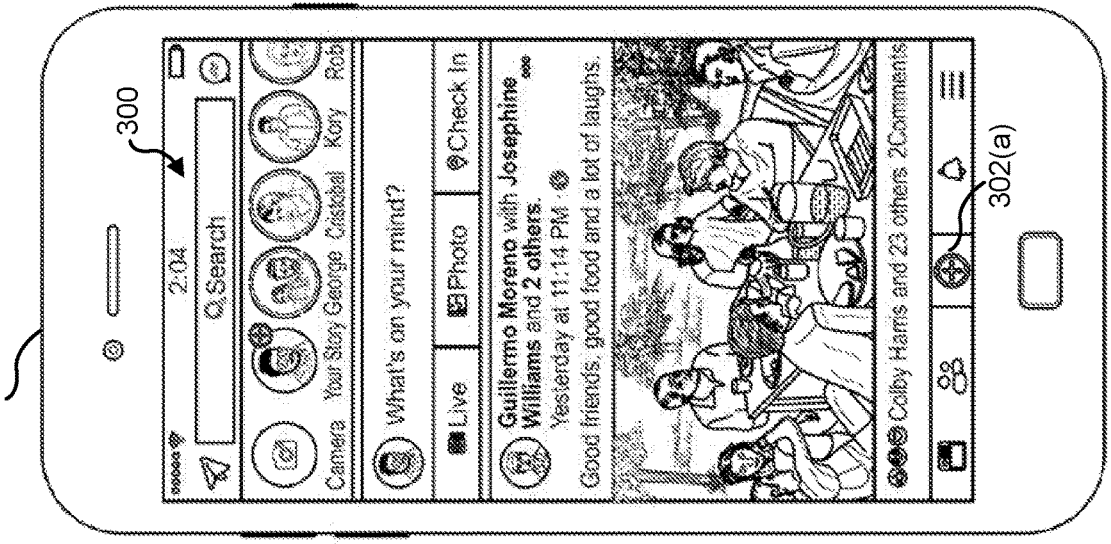
FIG. 3C
FIG. 3B
FIG. 3A

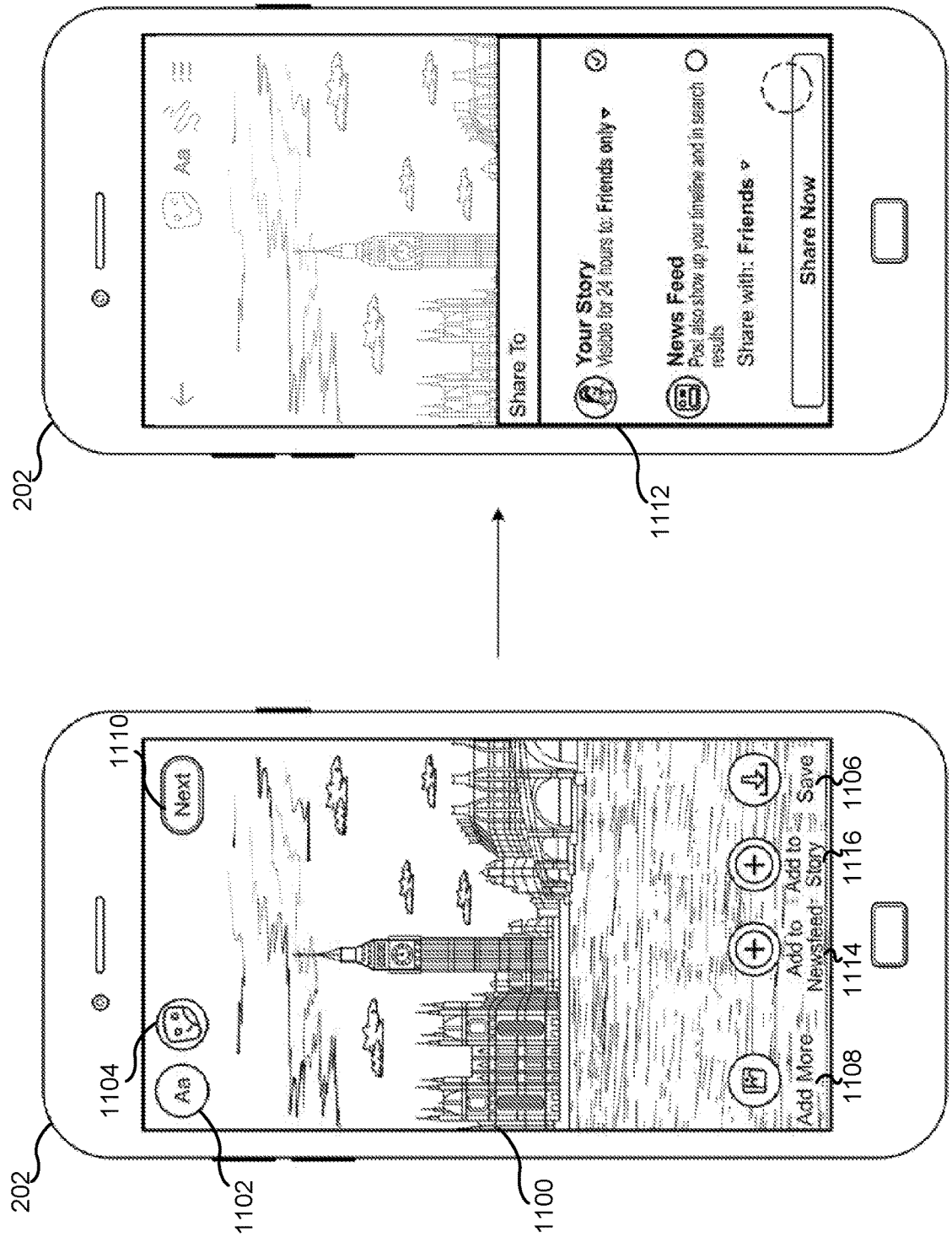

SYSTEMS AND METHODS FOR COLLECTING MULTIPLE FORMS OF DIGITAL CONTENT USING A SINGLE LANDING SCREEN

BACKGROUND

Over time, the number of choices a user is given when creating a social media composition has grown. For example, a user may select media items from a variety of sources, change the color and/or background of text, select different types of metadata, and/or select a flow or arrangement for content. Providing the user with more choice expands his or her digital creative range. However, it may also complicate the creation flow, requiring the user to toggle between multiple different screens and/or to complete a high number of user actions. The disclosed systems and methods, therefore, identify a need for improved systems and methods for reducing the number of screens that a user must toggle between and/or the number of user actions that must be completed by the user for the user to create a social media composition.

SUMMARY

As will be described in greater detail below, the instant disclosure describes various systems and methods for collecting multiple forms of digital content using a single landing screen. In one example, a computer-implemented method for collecting multiple forms of digital content, using a single landing screen, may include (1) receiving, via a social media application installed on a user device, user input that triggers a composition creation process, (2) in response to receiving the user input, providing, via a display element of the user device, a composition landing screen with multiple landing spaces including (i) a media space that displays one or more media items that may be selected by a user of the user device, (ii) a text space that enables the user to input text, and (iii) a metadata space that displays one or more metadata items that may be selected by the user, and (3) creating a social media composition based at least in part on the user content received from the composition landing screen.

In one embodiment, the landing spaces may further include a posting space. In this embodiment, the method may further include (1) receiving user input submitted by the user, via the posting space of the composition landing screen, requesting to post the social media composition and (2) in response to receiving the user input submitted via the posting space of the composition landing screen, posting the social media composition on a consumption channel associated with the social media application. In some examples, the multiple landing spaces may be displayed on the composition landing screen as multiple vertically arranged layers.

In one embodiment, the media items displayed in the media space may represent a subset of media items that are stored by the user device. The subset of media items may include, without limitation, one or more photos or one or more videos. In some examples, the media items stored by the user device may represent media items stored in a camera roll of the user device. In one embodiment, the media space may further include a live a video space from which a new media item may be generated.

In one example, receiving the user content may include receiving (1) text submitted via the text space and (2) at least one media item selected from the media space. In this example, the user may have submitted the text and the media item using the composition landing screen without being required to toggle between the composition landing screen and any additional screen. In one such example, the method may further include receiving a metadata item submitted via the metadata space. In some examples, after creating the social media composition, the method may further include (1) collecting subsequent text via the text space of the composition landing screen at a subsequent moment in time, (2) determining, at the subsequent moment in time, that the user has submitted user input requesting to post a subsequent social media composition with the subsequent text without having submitted any media items via the media space of the composition landing screen, and (3) creating a text-based composition that includes the text collected via the text space at the subsequent moment in time.

In some examples, the metadata space may allow the user to submit location metadata, feelings metadata, and/or friend metadata. In additional or alternative examples, the metadata space may allow the user to submit weather metadata, time metadata, a life event, and/or a graphic.

In one embodiment, a system for implementing the above-described method may include a receiving module, stored in memory of a user device, configured to receive, via a social media application installed on the user device, user input that triggers a composition creation process. The system may also include a landing module, stored in the memory of the user device, configured to provide, in response to the receiving module receiving the user input, a composition landing screen with multiple landing spaces including (i) a media space that displays one or more media items that may be selected by the user, (ii) a text space that enables the user to input text, and (iii) a metadata space that displays one or more metadata items that may be selected by the user. The landing module may also be configured to (1) receive, from the composition landing screen, user content submitted to one or more of the landing spaces and (2) create a social media composition based at least in part on the user content received from the composition landing screen. The system may also include one or more physical processors configured to execute the modules of the system (e.g., the receiving module and the landing module).

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive, via a social media application installed on a user device, user input that triggers a composition creation process, (2) in response to receiving the user input, provide, via a display element of the user device, a composition landing screen with multiple landing spaces (e.g., a media space that displays one or more media items that may be selected by the user, a text space that enables the user to input text, and a metadata space that displays one or more metadata items that may be selected by the user), (3) receive, from the composition landing screen, user content submitted to one or more of the landing spaces, and (4) create a social media composition based at least in part on the user content received from the composition landing screen.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIGS. 3A-3C are illustrations of an exemplary predecessor screen that navigates to a composition landing screen.

FIG. 11A-11B are an illustration of an exemplary single-media creation flow.

Figure 1:
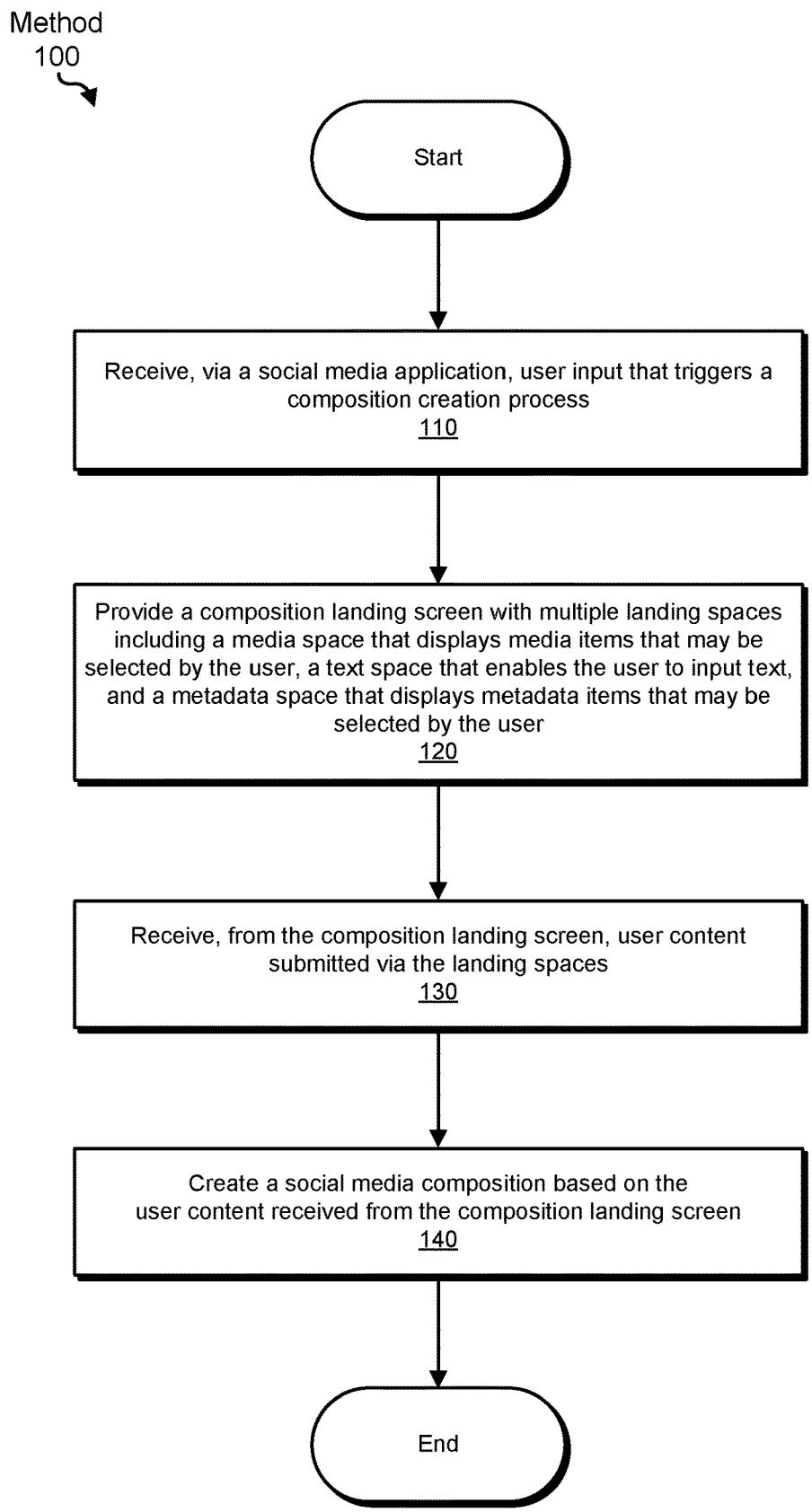
FIG. 1 is a flow diagram of an exemplary method for collecting multiple forms of digital content using a single composition landing screen.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for collecting multiple forms of digital content using a single landing screen. As will be explained in greater detail below, embodiments of the instant disclosure may provide a single composition landing screen presented to a user who has opened a social media application and initiated a composition process. The single landing screen may allow the user to add different forms of content to a social media composition, limiting the number of screens a user must toggle between to create the composition.

In some examples, the single landing screen may be used to add media (such as a digital photograph and/or a digital video), text (e.g., a caption for the media), and metadata items (e.g., feelings information, friend information, location information, weather information, time information, a life event, informational graphics, etc.). The single landing screen may include various vertically aligned layers, with each layer collecting a different type of content. For example, the single landing screen may include a text layer, a media layer, a metadata layer, and a posting layer. In some examples, the media layer may include a camera roll area, which allows the user to select digital photographs and/or digital videos stored on the user's device. Additionally or alternatively, the media layer may include a live camera area, which allows the user to use the single landing screen to capture a photograph and/or video of a live event, without toggling to an additional screen in order to capture the live photo and/or video.

By limiting the number of screens the user must toggle between and/or the number of user actions a user must complete in order to create a social media composition, the disclosed systems and methods may increase the ease with which a user may create social media compositions and reduce the time required to create such compositions. Reducing the number of screens and/or user actions may also improve the functioning of a computer system by reducing data storage, processing, and associated resources and overhead. Thus, computing resources may be more efficiently utilized. In addition, the present disclosure provides a technical solution to a technical problem of utilizing computing resources more efficiently.

The following will provide, with reference to FIG. 1, detailed descriptions of computer-implemented methods for collecting multiple forms of digital content using a single landing screen. Detailed descriptions of corresponding example systems will also be provided in connection with FIG. 2. In addition, detailed descriptions of exemplary creation flows will be provided in connection with FIGS. 3-15.

FIG. 1 is a flow diagram of an exemplary computer-implemented method 100 for creating social media compositions using a single composition landing screen. The steps shown in FIG. 1 may be performed by any suitable computer-executable code and/or computing system, such as the systems described herein. In one embodiment, the steps shown in FIG. 1 may be performed by modules operating within a mobile device. For example, the steps shown in FIG. 1 may be performed by modules operating in a user device 202 as shown in exemplary system 200 in FIG. 2.

Figure 2:
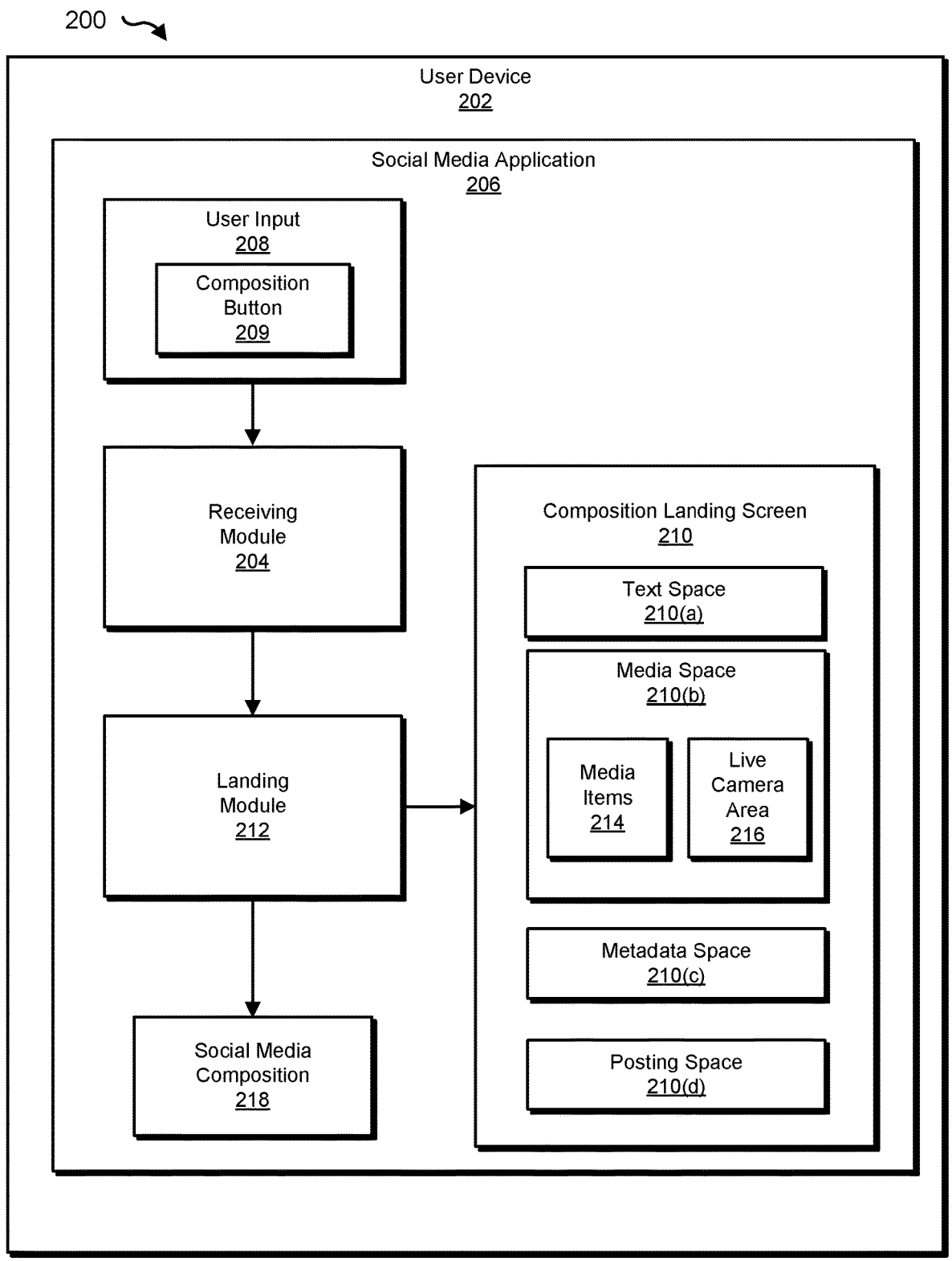
FIG. 2 is a block diagram of an exemplary system for collecting multiple forms of digital content using a single composition landing screen.

As illustrated in FIG. 1, at step 110, one or more of the systems described herein may receive, via a social media application installed on a user device, user input that triggers a composition creation process. For example, as illustrated in FIG. 2, a receiving module 204, operating as part of a social media application 206 installed on user device 202, may receive user input 208 that initiates a composition creation process (i.e., a process to create a social media composition).

User device 202 generally represents any type or form of computing device capable of reading computer-executable instructions. For example, user device 202 may represent a user device such as a smart phone and/or a tablet. Additional examples of user device 202 may include, without limitation, laptops, desktops with mobile elements, wearable devices, personal digital assistants (PDAs), etc. In some examples, a user of user device 202 may have a user account with a social-networking platform and may have a social media application managed by the social-networking platform and associated with the user's account (e.g., social media application 206) installed on user device 202.

Social media application 206 generally represents any type or form of computer program that may be installed and executed on user device 202 to cause user device 202 to perform useful tasks. In some examples, social media application 206 may represent a social media application managed by a social-networking platform. In these examples, social media application 206 may include both a composition functionality and a consumption functionality. The composition functionality may be used to create digital social media compositions to share with other users (e.g., using a composition process presented via one or more graphical user interfaces of social media application 206). The consumption functionality may be used to view user compositions created by other users (e.g., via a newsfeed and/or stories stream presented via one or more graphical user interfaces of social media application 206).

Receiving module 204 may receive user input 208 in a variety of ways. In some embodiments, user input 208 may be received by one or more sensors embedded in user device 202. To give a specific example, user device 202 may represent a touchscreen device and receiving module 204 may receive user input 208 in response to a physical gesture being detected, by sensors embedded in a touchscreen of user device 202, at a position on the touchscreen corresponding to a composition trigger. Additionally or alternatively, user device 202 may be coupled to an auxiliary device, such as a computer mouse and/or a keyboard, and receiving module 204 may receive user input 208 in response to a physical gesture being detected by the auxiliary device while a cursor controlled by the auxiliary device is at a position on a display element of user device 202 that corresponds to the composition trigger.

In some examples, the composition creation process may be automatically triggered when social media application 206 is opened. In these examples, user input 208 may represent a user selection to open social media application 206. For example, a home screen of user device 202 may include a home-screen button associated with social media application 206 and user input 208 may select the home-screen button.

In other examples, the composition creation process may not be automatically triggered when social media application 206 is opened (e.g., in embodiments in which a newsfeed screen is automatically launched when social media application 206 is opened), or a user may be attempting to initiate the composition creation process from another screen displayed within social media application 206 (i.e., a non-composition screen), such as the newsfeed screen or a messaging center screen. In these examples, a predecessor screen, from which the composition creation process may be triggered, may include a composition button 209 (i.e., a graphical control element) which, when selected, triggers the composition creation process and user input 208 may select composition button 209.

Composition button 209 may depict a variety of glyphs. For example, FIG. 3A is an illustration of an exemplary predecessor screen 300 (a newsfeed in this example) with a composition button 302(*a*) that depicts a glyph of a plus sign (i.e., conveying that the user may add a composition to his or her profile by selecting the composition button). As another example, FIG. 3B is an illustration of exemplary predecessor screen 300 with a composition button 302(*b*) that depicts a glyph of a pen and writing pad. As yet another example, FIG. 3C is an illustration of exemplary predecessor screen 300 with a composition button 302C that includes a glyph of a camera.

In some embodiments, composition button 302(*b*) may be utilized to trigger a process that facilitates creating a text-based composition and composition button 302(*c*) may be utilized to trigger a process that facilitates creating a media-based composition. In one such embodiment, the systems and methods described herein may further include a glyph module that selects a glyph for a composition button, to be displayed on a predecessor screen of a particular user account, based on user history. For example, the glyph module may determine that more than a threshold number and/or percentage of compositions posted by a particular user account are text-based compositions. In this example, the glyph module may select a composition button with a text glyph, such as composition button 302(*b*) illustrated in FIG. 3B, to be displayed on a predecessor screen of the particular user account.

As another example, the glyph module may determine that more than a threshold number and/or percentage of compositions posted by the particular user account are media-based compositions. In this example, the glyph module may select a composition button with a camera glyph, such as composition button 302(*c*), to be displayed on the predecessor screen of the particular user account.

Returning to FIG. 1, at step 120, one or more of the systems described herein may, in response to receiving the user input, provide, via a display element of the user device, a composition landing screen. For example, as illustrated in FIG. 2, a landing module 212 may provide a composition landing screen 210 via a display element of user device 202. As used herein, the term "composition landing screen" generally refers to any type or form of computer-mediated user interface presented to a user initiating a composition creation process. In some examples, the composition landing screen may be the first screen presented to the user after the composition creation process is initiated.

Composition landing screen 210 may include multiple spaces. For example, composition landing screen 210 may include a text space 210(*a*), which enables the user to input text, a media space 210(*b*), which displays one or more media items that may be selected by a user, a metadata space 210(*c*), which displays one or more metadata items that may be selected by the user, and a posting space 210(*d*), which the user may select when he or she is ready to post a social media composition created using composition landing screen 210.

By providing a text space, a media space, and a metadata space on the same landing screen, the disclosed systems and methods may limit the number of screens that a user must toggle between in order to create a social media composition. In some examples, presenting each of these spaces on the same landing screen may allow a user to create a social media composition without needing to toggle between a composition landing screen and any other screen. Additionally or alternatively, presenting each of the spaces on the same landing screen may simplify the navigation process for users creating social media compositions and/or limit a number of user actions required to create a social media composition.

Figure 4:
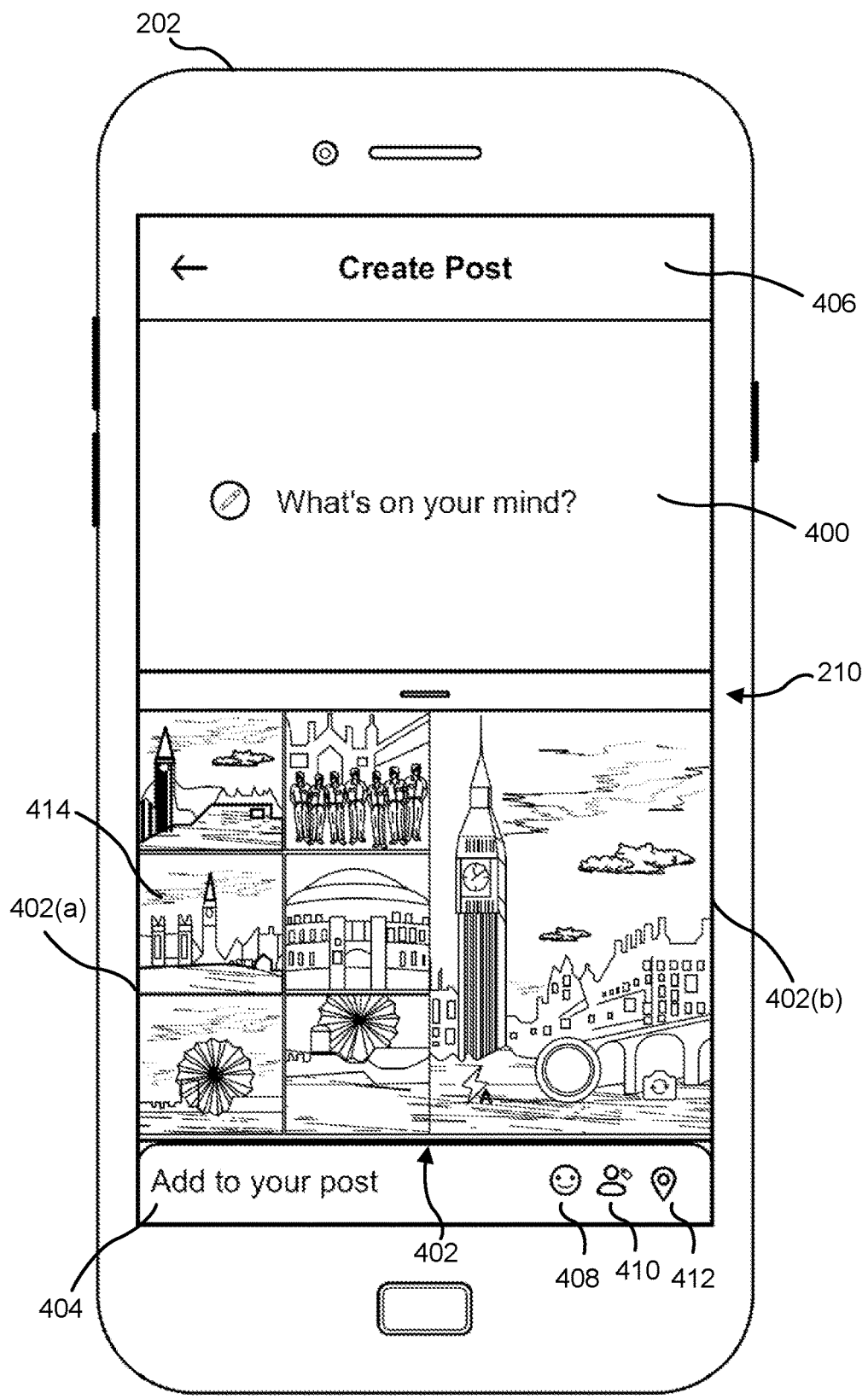
FIG. 4 is an illustration of an exemplary composition landing screen with vertical landing spaces.

Composition landing screen 210 may be arranged according to a variety of configurations. In some embodiments, the spaces within composition landing screen 210 may be displayed as a series of vertically arranged layers, as depicted in FIG. 4. As illustrated in FIG. 4, the vertically arranged layers may include a text layer 400, a media layer 402, a metadata layer 404, and a posting layer 406.

Figure 5:
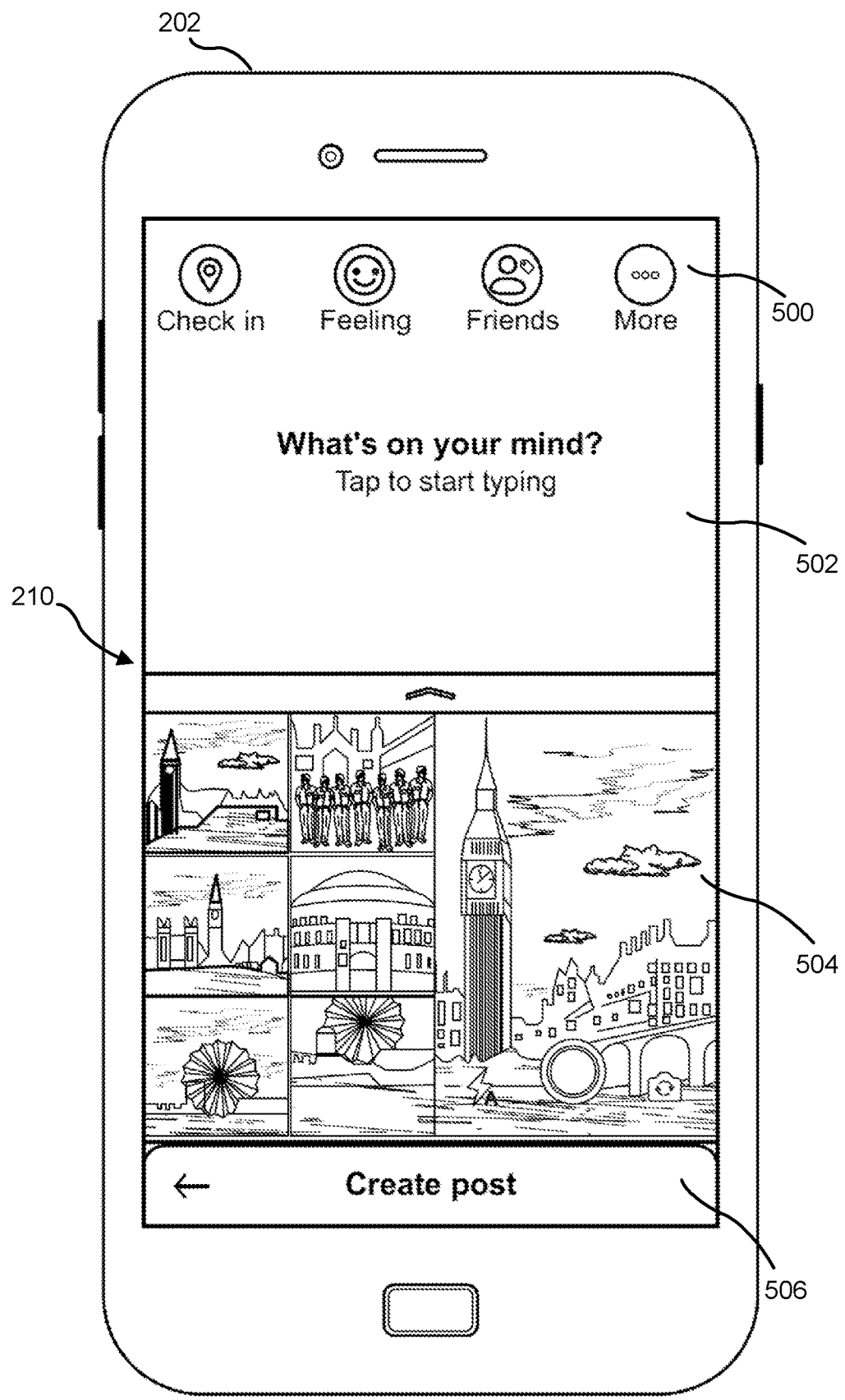
FIG. 5 is an illustration of an additional exemplary composition landing screen with vertical landing spaces.
Figure 6:
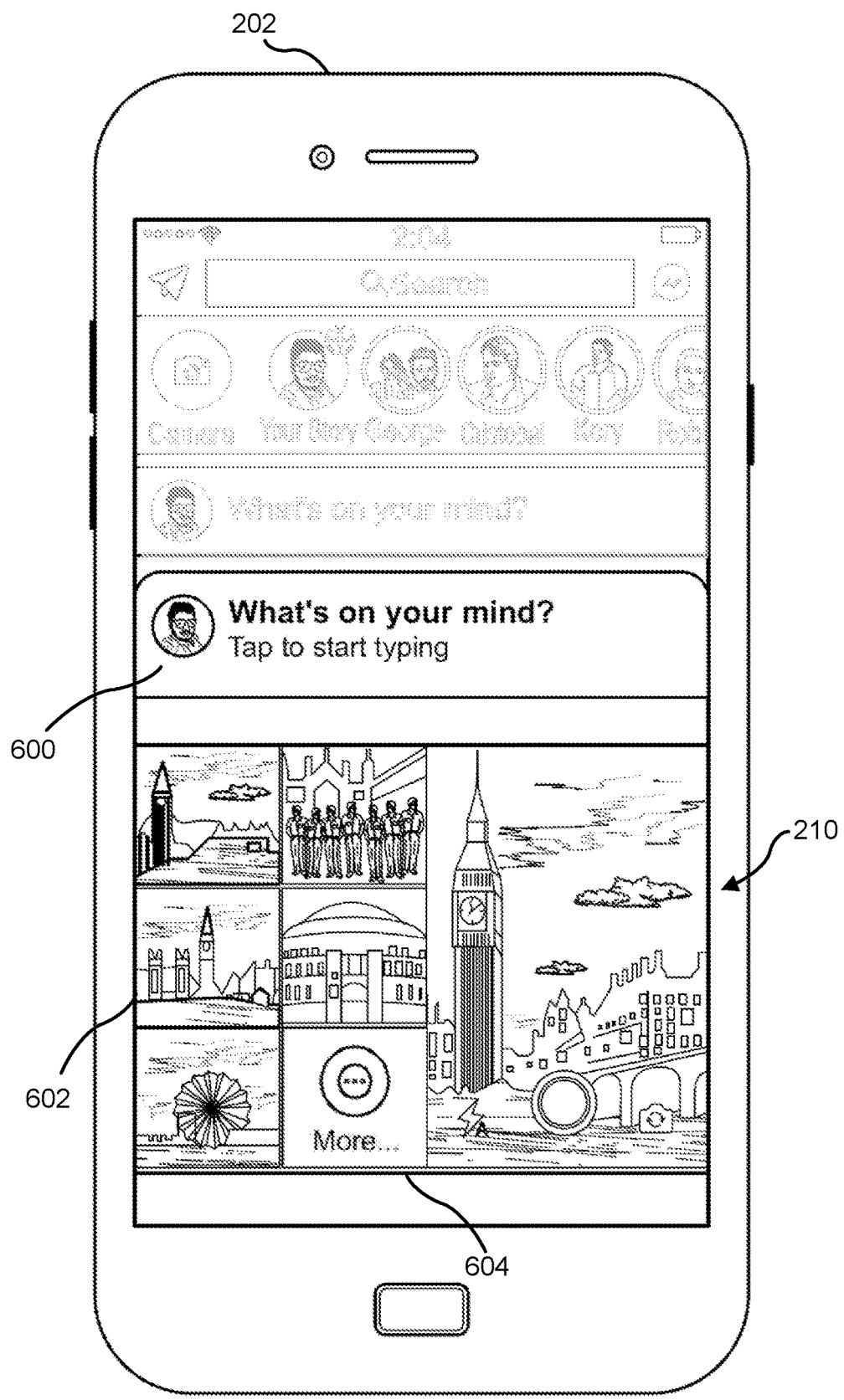
FIG. 6 is an illustration of another exemplary composition landing screen with vertical landing spaces.

The vertical layers described above may be arranged in a variety of ascending orders. For example, as shown in FIG. 4, posting layer 406 may be positioned as the top layer, followed by text layer 400, followed by media layer 402, with metadata layer 404 positioned as the bottom layer. FIG. 5 illustrates another embodiment of composition landing screen 210 in which a media layer 500 may be positioned as the top layer, followed by a text layer 502, followed by a media layer 504, with a posting layer 506 positioned as the bottom layer. FIG. 6 illustrates another embodiment of composition landing screen 210 in which a text layer 600 may be positioned as the top layer and a media layer 602 may be positioned as the bottom layer.

Figure 7:
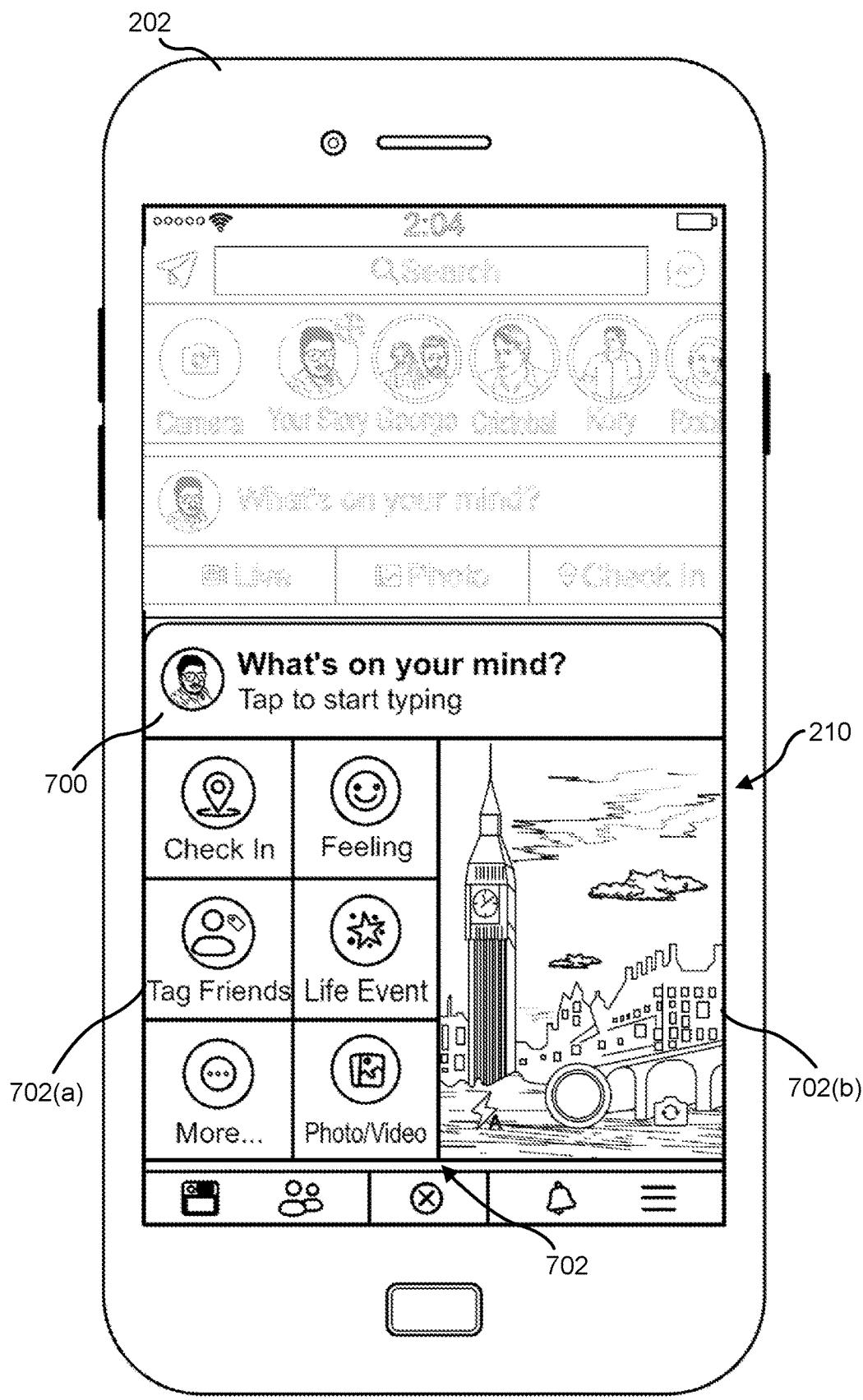
FIG. 7 is an illustration of an exemplary composition landing screen with vertical and horizontal landing spaces.
Figure 8:
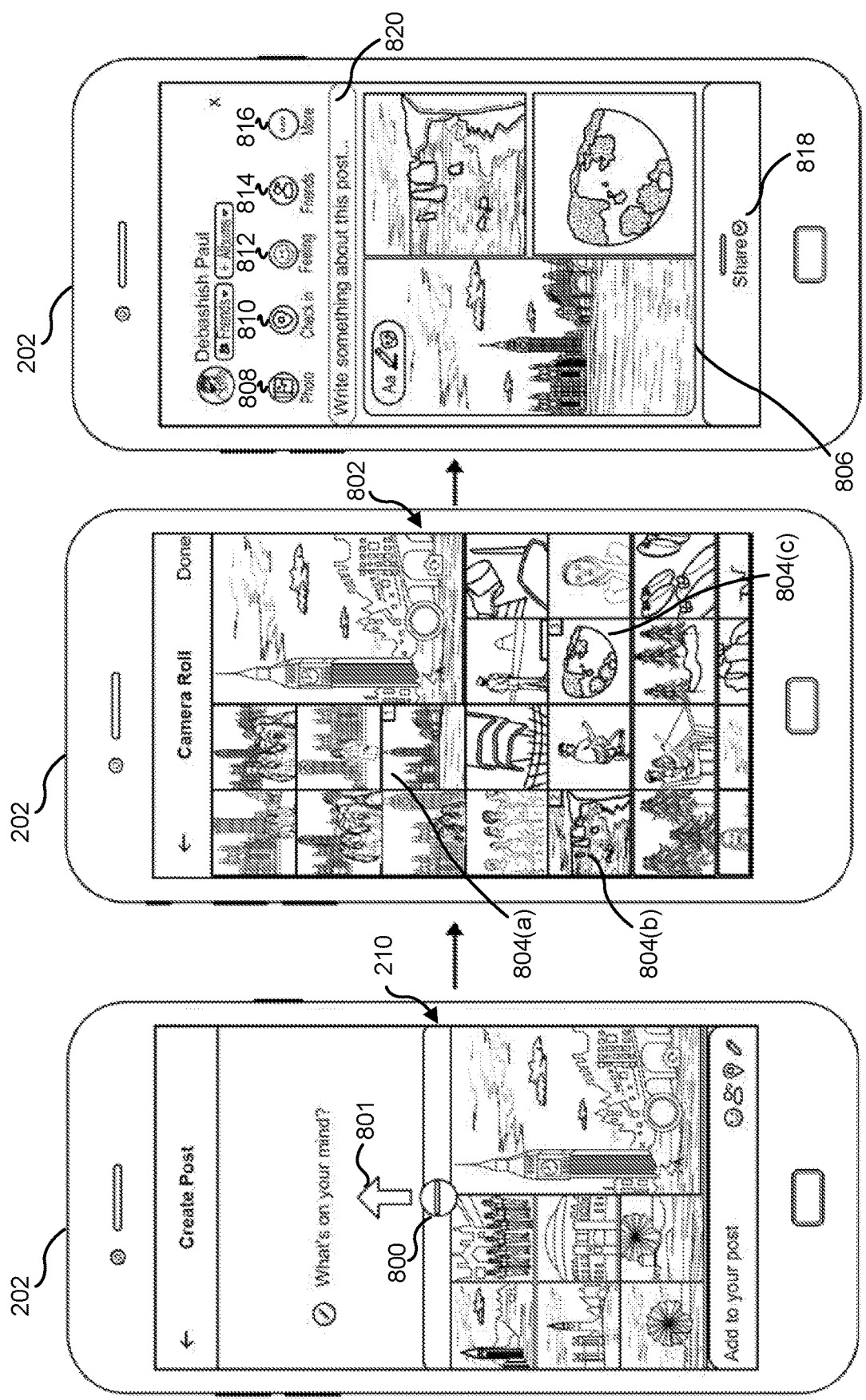
FIGS. 8A-8C are an illustration of an exemplary expansion screen sequence.
Figure 9:
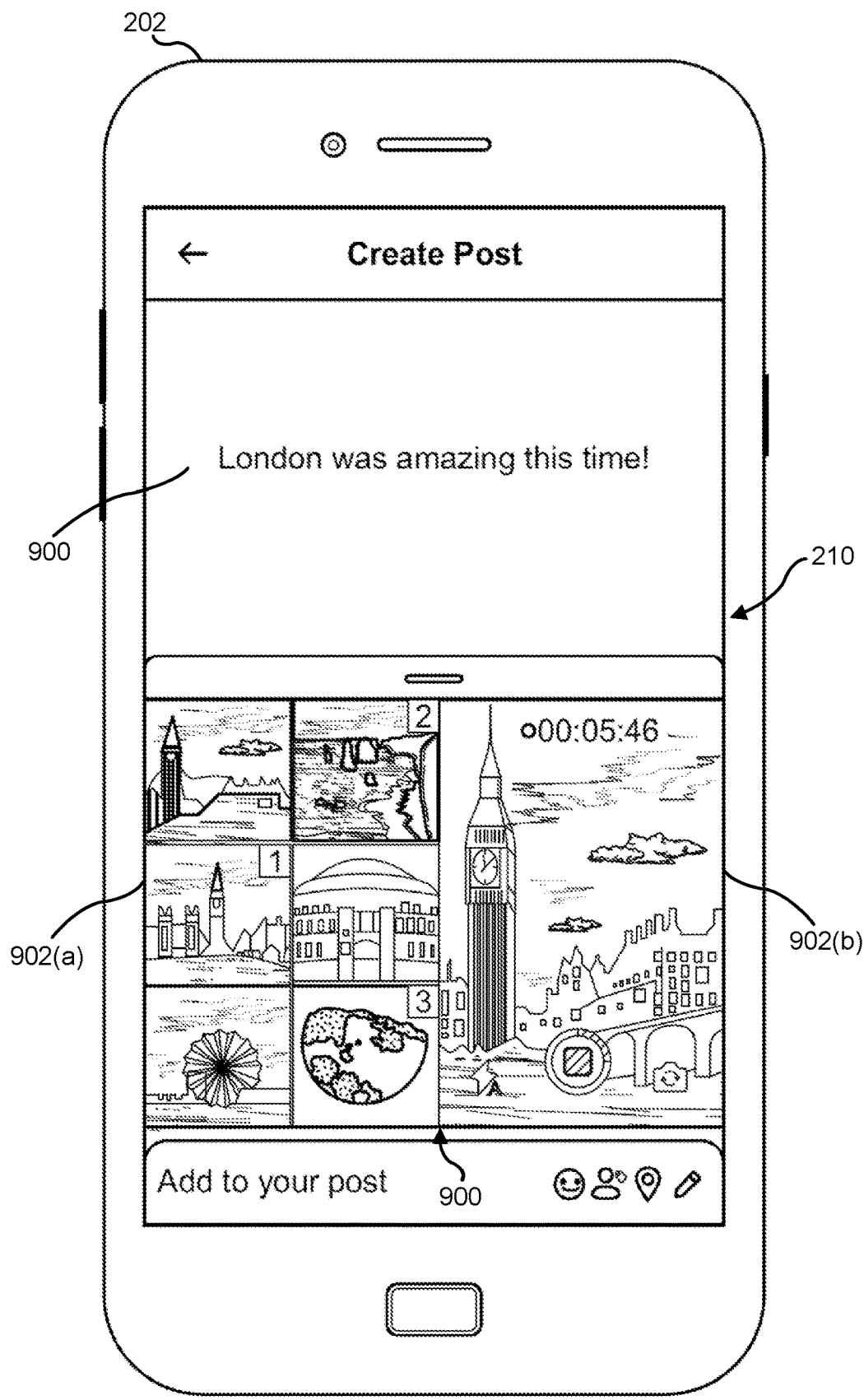
FIG. 9 is an illustration of the exemplary composition landing screen illustrated in FIG. 4 populated with exemplary user input.
Figure 10C:
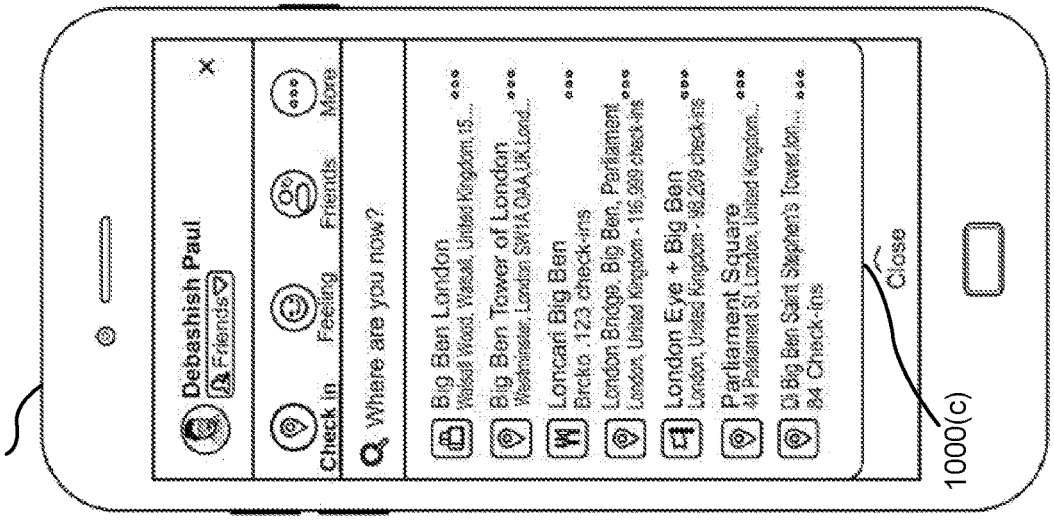
FIG. 10C is an illustration of an exemplary location metadata screen.
Figure 10B:
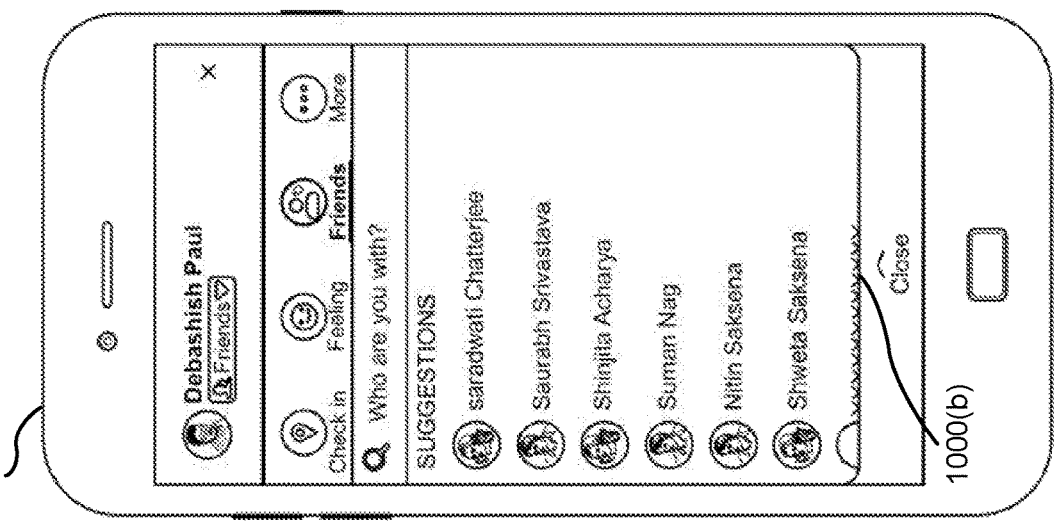
FIG. 10B is an illustration of an exemplary friends metadata screen.
Figure 10A:
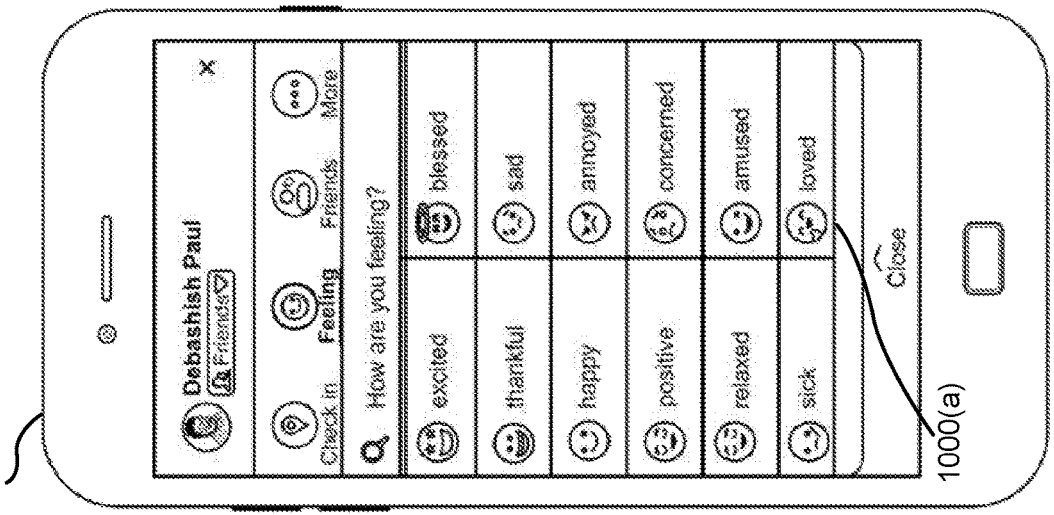
FIG. 10A is an illustration of an exemplary feelings metadata screen.
Figure 12:
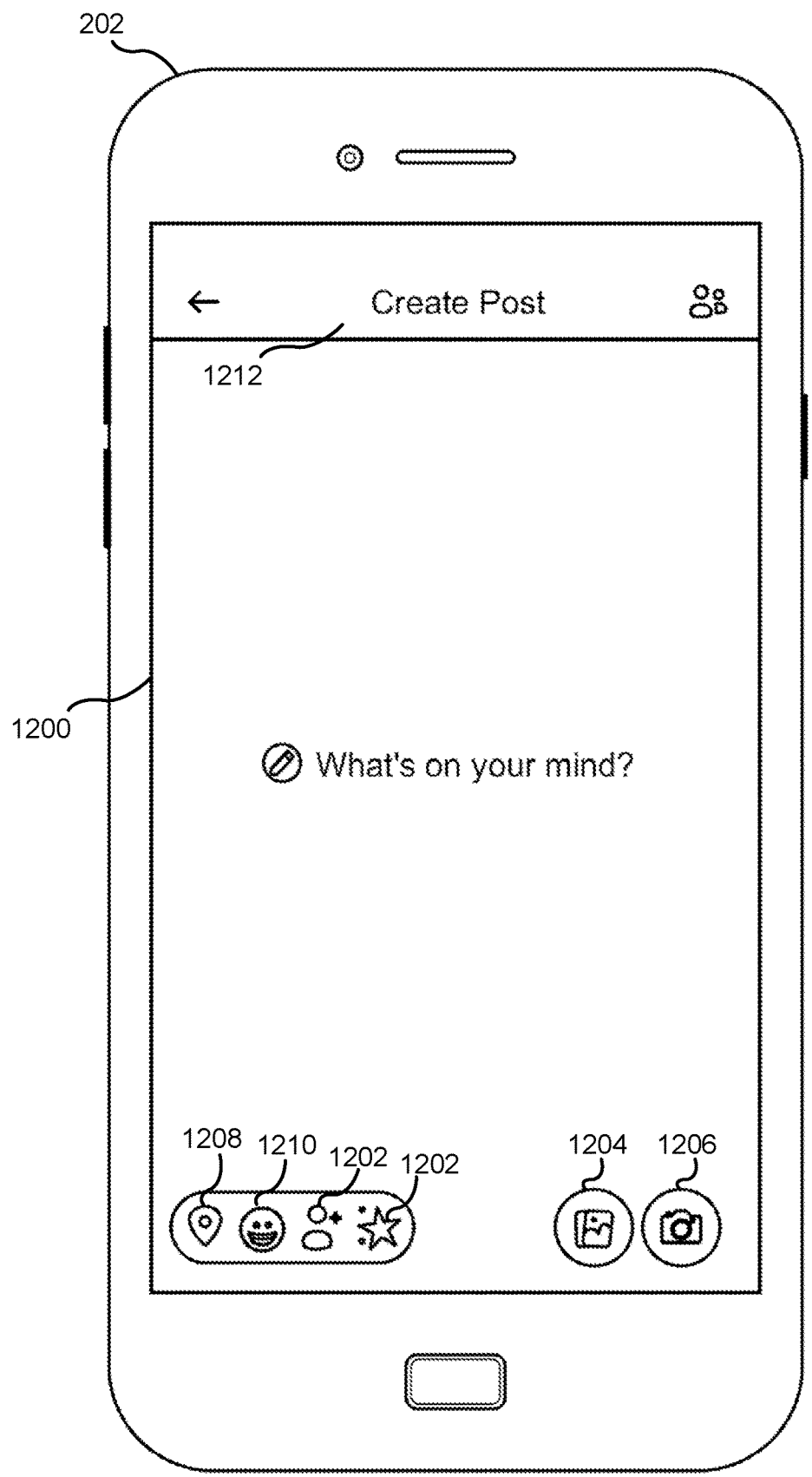
FIG. 12 is an illustration of an exemplary text creation screen.

In alternative embodiments, some of the landing spaces may be vertically arranged while others are horizontally arranged. For example, as shown in FIG. 7, a text layer 700 of composition landing screen 210 may be positioned as a top layer, followed by a media-metadata layer 702 that includes a metadata space 702(a) positioned next to a media space 702(b) in a same horizontal plane. In some examples, as illustrated by FIGS. 6-7, composition landing screen 210 may hover above a predecessor screen without completely blocking the predecessor screen from view.

Returning to FIG. 2, each of the landing spaces within composition landing screen 210 may include a variety of configurations. Exemplary configurations for text space 210(a), media space 210(b), and metadata space 210(c) will each be discussed, in turn.

First, text space 210(a) may include a variety of configurations. For example, text space 210(a) may include a text entry box in which a user may submit text with a prompt to input text. Using FIGS. 4-7 as specific examples, media layer 402 may include a text entry box with the prompt "what's on your mind?" and/or the prompt "tap to start typing." Additionally or alternatively, text space 210(a) may include a button (e.g., with a glyph of a pen or a typewriter) that indicates that text space 210(a) is configured for submitting text.

In some examples, a prompt and/or button displayed within text space 210(a) may vary based on user actions completed prior to accessing composition landing screen 210. For example, in one embodiment, text space 210(a) may be configured to identify a copy action (e.g., most recently performed by a user prior to accessing composition landing screen 210).

In this embodiment, landing module 212 may display (1) a prompt in text space 210(a) to paste an object copied by the copy action and/or (2) a digital paste-button in text space 210(a) that, when selected via user input, pastes the object into text space 210(a). For example, landing module 212 may determine that a user, prior to accessing composition landing screen 210, copied a particular link and, in response to the determination, may present a prompt in text space 210(a) with the text "Paste copied link here?" and/or may present a digital paste-button that, when selected, pastes the copied link into text space 210(a). In another example, landing module 212 may determine that a user, prior to accessing composition landing screen 210, copied a media item (e.g., a movie trailer) and/or a link to a webpage that includes the media item. In this example, landing module 212 may, in response to the determination, provide, in text space 210(a), a prompt to paste the media item and/or a digital paste-button that pastes the media item into text space 210(a) when the digital paste-button is selected via user input.

Next, media space 210(b) may include a variety of configurations. In some examples, media space 210(b) may include multiple media items (illustrated in FIG. 2 as media items 214) that may be selected via media space 210(b) for inclusion in a social media composition. Media items 214 may include a variety of types of media items, including, without limitation, digital photographs, digital videos, graphics (e.g., Graphics Interchange Format (GIF) files), etc.

In one example, media items 214 may represent a series of media items that are stored by user device 202. For example, as illustrated in FIGS. 4-6, media space 210(b) may include a series of digital photographs and/or digital videos (e.g., digital photographs 402(a) illustrated in FIG. 4) stored by user device 202. In one example, the series of media items may represent digital photographs and/or digital videos from a camera roll database of user device 202. In this example, the media items may represent a subset of the digital photographs and/or digital videos stored by the camera roll that were most recently added to the camera roll. For example, digital photographs 402(a) may represent the six photographs most recently taken by user device 202 and stored to the camera roll of user device 202. In another example, the media items may represent a subset of the digital photographs and/or digital videos stored by the camera roll that were most often and/or most recently shared (e.g., via a text message, email, and/or social networking application) and/or most recently designated in the camera roll as preferred via user input.

In examples in which a subset of media items that are stored by user device 202 are displayed in media space 210(b), the user may expand media space 210(b) to display a remaining portion of stored media items. Using FIG. 8A as a specific example, a user may select an expansion bar 800 from composition landing screen 210 and scroll upward (e.g., in the direction of arrow 801) to reveal a full media screen 802 (shown in FIG. 8B) displaying an expanded set of media items 804 from a camera roll of user device 202. Using FIG. 6 as an additional specific example, a user may select an additional-media button 604 to reveal an expanded set of media items from a camera roll of user device 202 (i.e., via a full media screen such as full media screen 802).

Returning to FIG. 2, in some examples, media space 210(b) may further include a live camera area 216, such as live camera area 402(b) illustrated in FIG. 4, from which a new media item may be generated. In these examples, a user may capture a digital photograph and/or video to include in a social media composition using the same screen (i.e., the composition landing screen) used to submit text, previously captured photos and/or videos, and metadata.

Finally, metadata space 210(c) may include a variety of configurations. For example, metadata space 210(c) may, in some examples, include a variety of user-selectable glyphs corresponding to different types of metadata that may be added to a social media composition. Using FIG. 4 as a specific example, metadata layer 404 may include a feelings glyph 408, a friends glyph 410, and a location glyph 412.

Returning to FIG. 1, at step 130, one or more of the systems described herein may receive, from the composition landing screen, user content submitted to one or more of the landing spaces. For example, as illustrated in FIG. 2, landing module 212 may receive, from composition landing screen 210, user content submitted from at least one of text space 210(a), media space 210(b), and metadata space 210(c).

In some examples, composition landing screen 210 may allow a user to create a social media composition that includes both text and media using a single screen (i.e., without requiring the user to toggle between multiple screens to create the composition). In these examples, landing module 212 may receive content submitted both from text space 210(a) and content submitted via media space 210(b). Using FIG. 9 as a specific example, a user may submit the text "London was amazing this time!" to a text space 900, select three photos from a camera roll area 902(a) displayed in a media space 902, and record a live video using a live video area 902(b) of media space 902, all within composition landing screen 210 (i.e., without toggling between composition landing screen 210 and any other screen). Thus, by including a group of selectable media items, a live camera area, and a text area on composition landing screen 210, the disclosed systems and methods may reduce the number of user actions (e.g., clicks or toggles between screens) required to create a social media composition.

In some additional examples, composition landing screen 210 may further allow a user to add metadata items to a social media composition using the same screen (i.e., without requiring the user to toggle to an additional metadata screen). Alternatively, composition landing screen 210 may include user-selectable elements that, in response to being selected, navigate to an additional metadata screen. Using FIGS. 4 and 10A-10C to provide several specific examples, (1) feelings glyph 408 illustrated in FIG. 4 may, when selected, navigate to an additional feelings screen 1000(a) illustrated in FIG. 10A, (2) friends glyph 410 illustrated in FIG. 4 may, when selected, navigate to an additional friends screen 1000(b) illustrated by FIG. 10B, and (3) location glyph 412 illustrated in FIG. 4 may, when selected, navigate to an additional location screen 1000(c) illustrated by FIG. 10C. In these examples, a total number of user actions may still be reduced because of the efficiency gained by allowing the user to add both text and media without leaving composition landing screen 210.

In other examples, the single landing screen may allow the user to initiate his or her composition using any type of initial input (e.g., by entering text, selecting a media input, or selecting a media-expansion button such as expansion bar 800 in FIG. 8A), but one or more additional screens may be presented once the user has submitted the initial input. In these examples, landing module 212 may additionally receive user content from the one or more additional screens. The content of the additional screen may depend on the type of initial input. For example, as described above in connection with FIGS. 8A-8C, a full screen with an expanded set of media items may be presented in response to receiving user input selecting an expansion element, such as expansion bar 800 in FIG. 8A.

In some examples, landing module 212 may determine, based on an initial content selection and/or submission, that the user is attempting to create either a text-based composition or a media-based composition. For example, landing module 212 may receive user input selecting one or more media items (either from one of the media items displayed on composition landing screen 210 or from one of the media items displayed on full media screen 802 illustrated in FIG. 8B). In response, landing module 212 may automatically navigate to an additional media-composition screen that displays the selected media items.

Using FIGS. 8B and 8C as a specific example, landing module 212 may detect user input selecting media items 804(a), 804(b), and 804(c) from full media screen 802 illustrated in FIG. 8B. In response, landing module 212 may navigate to post-selection screen 806 illustrated in FIG. 8C, which displays the three selected media items and presents various digital buttons corresponding to specific user actions that may be selected by the user (e.g., an additional photos button 808, a location button 810, a feelings button 812, a friends button 814, a more button 816, a share button 818, and a text box 820).

In some examples, landing module 212 may navigate to the additional media-composition screen in response to receiving explicit user input (e.g., in response to receiving user input selecting a button with the text "done" or "next," such as done button 805 illustrated in FIG. 8B). In other examples, landing module 212 may operate in accordance with a single-media policy based on a prediction that the user intends to use a media item as the basis of a single-media composition. The single-media policy may instruct landing module 212 to automatically navigate to an additional media-composition screen in response to receiving user input selecting a first media item. The additional media-composition screen may display a full screen display of the first media item and superimpose, over the first media item, digital buttons associated with various user actions that may be selected by the user.

Using FIGS. 4 and 11A-11B as a specific example of a single-media creation flow, landing module 212 may receive user input selecting photograph 414 illustrated in media layer 402 in FIG. 4. In response to receiving the user input, landing module 212 may automatically retrieve and display an additional media-based composition screen 1100 illustrated in FIG. 11. As shown in FIG. 11A, additional media-based composition screen 1100 may include a full screen view of photograph 414 with a text digital button 1102 (which allows the user to add text to the composition), a metadata digital button 1104 (which allows the user to add metadata items to the composition), a save digital button 1106 (which allows the user to save the composition for future editing), an additional-media button 1108 (which allows the user to add additional media items to the composition, reversing the single-media presumption), a continuation button 1110 (which allows the user to continue to a subsequent additional composition screen, such as subsequent additional composition screen 1112 shown in FIG. 11B), a newsfeed button 1114 (which allows the user to add the composition to a newsfeed consumption channel), and/or a story button 1116 (which allows the user to add the composition to a story consumption channel).

In an additional or alternative example, landing module 212 may receive user input selecting a text box within text space 210(a) of composition landing screen 210. In response, landing module 212 may automatically navigate to an additional text-based composition screen. Using FIGS. 4 and 12 as a specific example of a text-based creation flow, landing module 212 may determine that the user is attempting to create a text-based composition based on a detection of user input selecting text layer 400. In response to this determination, landing module 212 may automatically retrieve and display an additional text-based composition screen 1200 illustrated in FIG. 12, which is text-based. Additional text-based composition screen 1200 may also include a variety of digital buttons: a friends button 1202 (to add friends), a media button 1204 (to add media items), a camera button 1206 (to navigate to a live camera screen), a location button 1208 (to add location data), a feelings button 1210 (to add feelings metadata), and a posting button 1212 (to post a social media composition on the social-networking platform).

In some examples, as illustrated by additional text-based composition screen 1200, the additional text-based composition screen may facilitate creating a plain-text composition. In other examples, the additional text-based composition screen may facilitate creating a Super Awesome Text Post (SATP) by providing various backgrounds which may be selected to display behind the user-generated text and various colors, fonts, and/or sizes that may be selected for the user-generated text. In some embodiments, as described above in connection with text space 210(*a*) in step 120, a prompt and/or button displayed by text-based composition screen may be selected based on a copy action performed by a user prior to navigating to text-based composition screen 1200.

Returning to FIG. 1, at step 140, one or more of the systems described herein may create a social media composition based on the user content received from the composition landing screen. For example, as illustrated in FIG. 2, landing module 212, operating within user device 202, may create social media composition 218 based on the user content received from composition landing screen 210.

Landing module 212 may create social media composition 210 in response to a variety of user input. In some examples (e.g., examples in which a user uses composition landing screen 210 to create a composition without toggling to any additional screen), landing module 212 may create social media composition 210 in response to receiving user input submitted to posting space 210(*d*). Using FIG. 4 as a specific example, landing module 212 may create social media composition 210 in response to receiving user input selecting posting layer 406, which includes the words "create post" with an arrow. In other examples (i.e., examples in which composition landing screen 210 navigates to another screen during the composition process), landing module 212 may create social media composition 210 in response to receiving user input submitted to the other screen (e.g., via a posting button such as share button 818 in FIG. 8).

Landing module 212 may create a variety of types of social media compositions, based on the user content received from composition landing screen 210. In one example, landing module 212 may create a multi-media composition. To give a specific example, landing module 212 may have received user input selecting media items 804(*a*), 804(*b*), and 804(*c*) from full media screen 802 illustrated in FIG. 8B. In response, landing module 212 may have presented post-selection screen 806 illustrated in FIG. 8C, from which landing module 212 may have received user input to a text box 820 of post-selection screen 806 with the text "London was amazing this time!" Alternatively, landing module 212 may have received user input selecting media items 804(*a*), 804(*b*), and 804(*c*) and the user-generated text "London was amazing this time!" all from composition landing screen 210.

Figure 13:
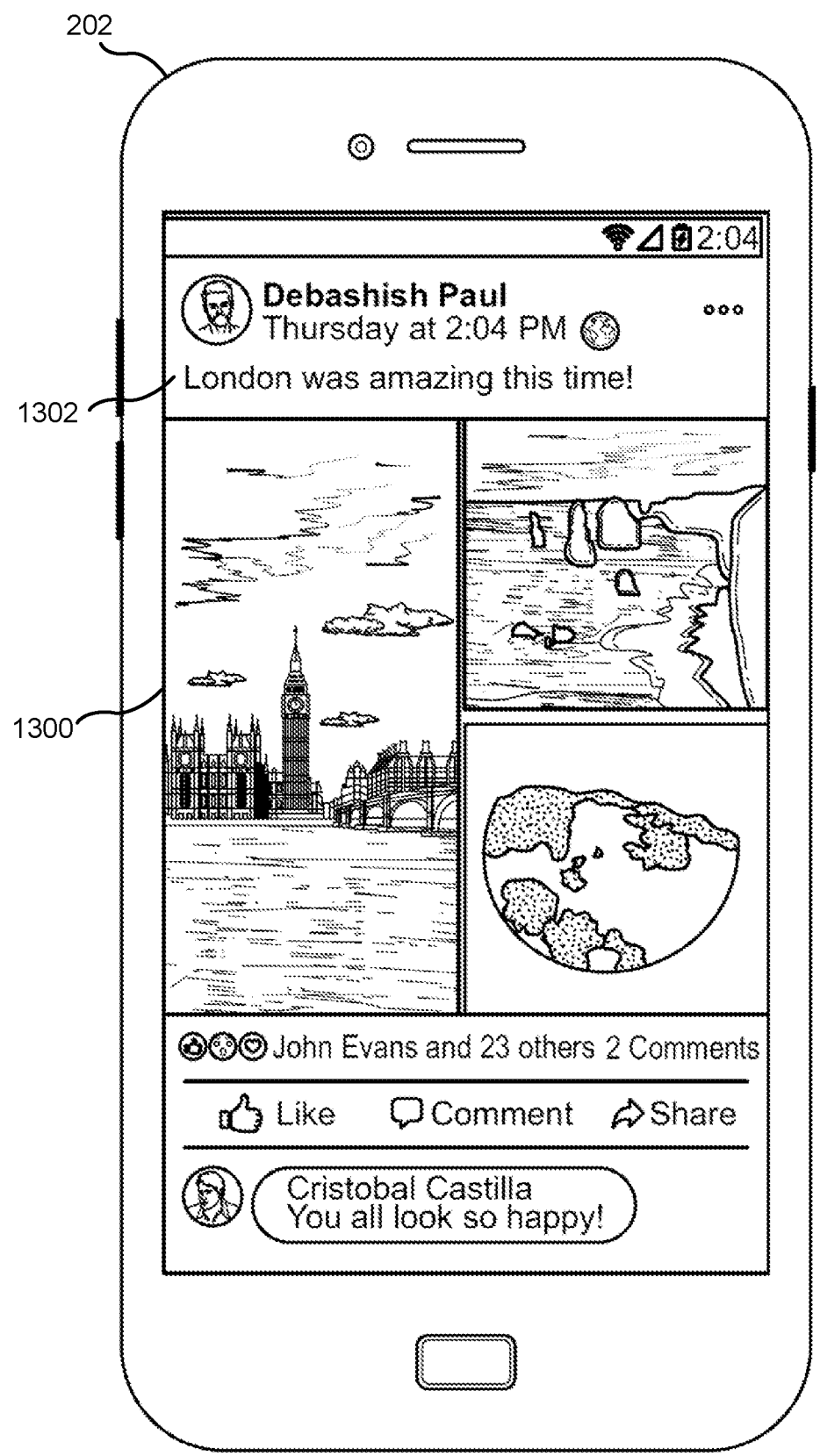
FIG. 13 is an illustration of an exemplary newsfeed composition.
Figure 14B:
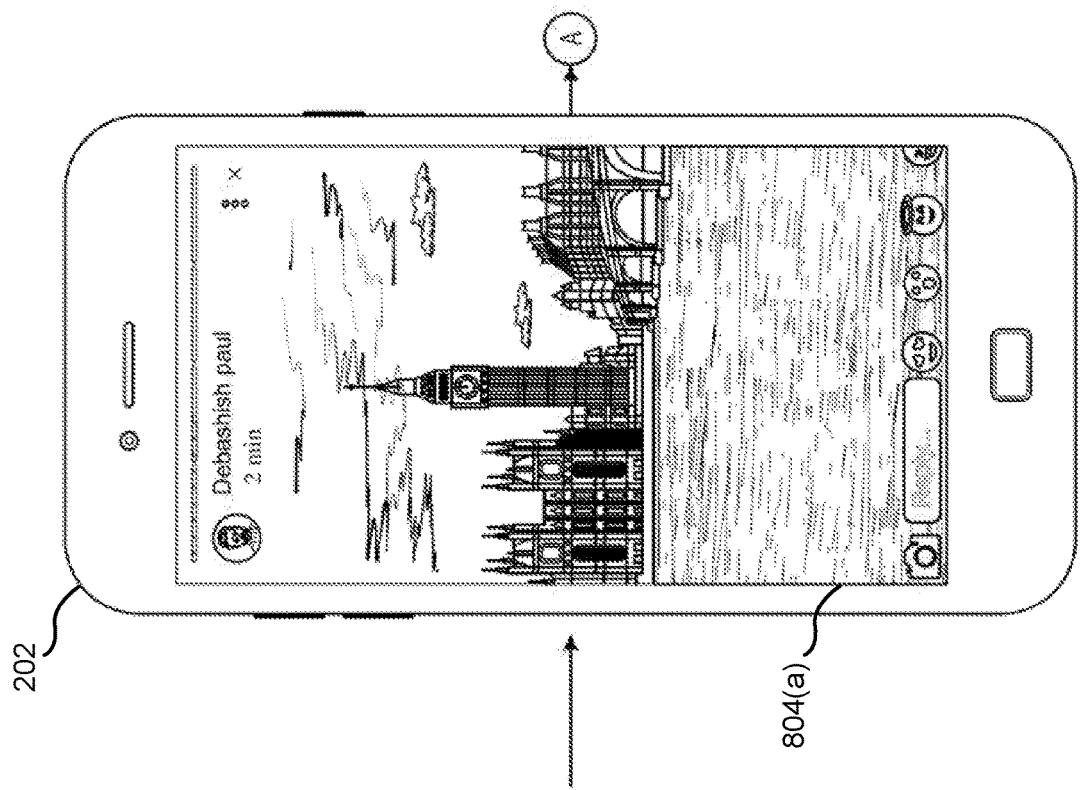
FIGS. 14A-14D are an illustration of an exemplary stories composition.
Figure 14A:
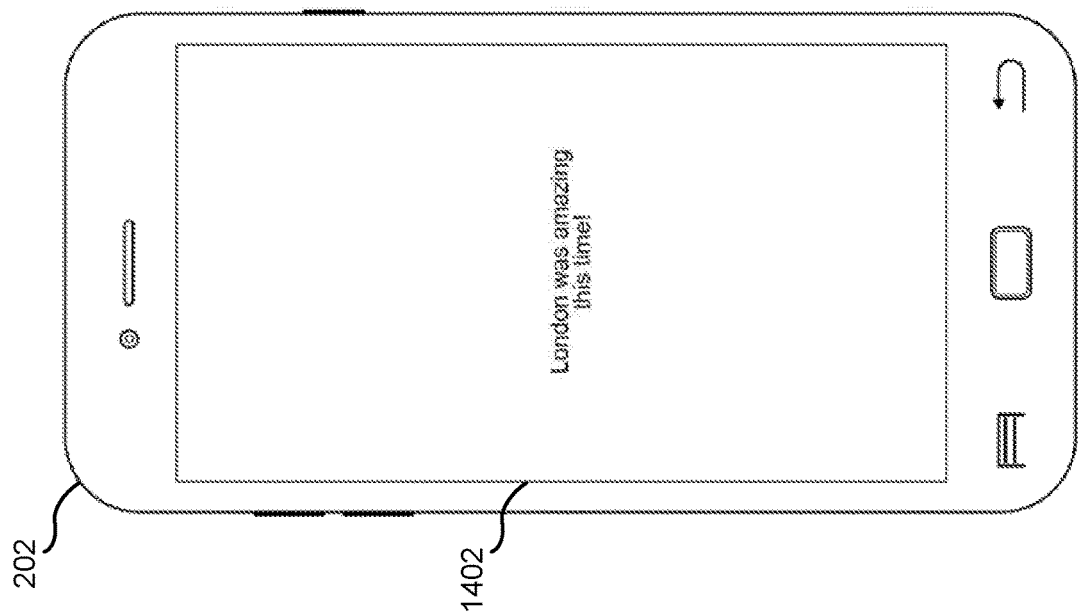
Figure 14D:
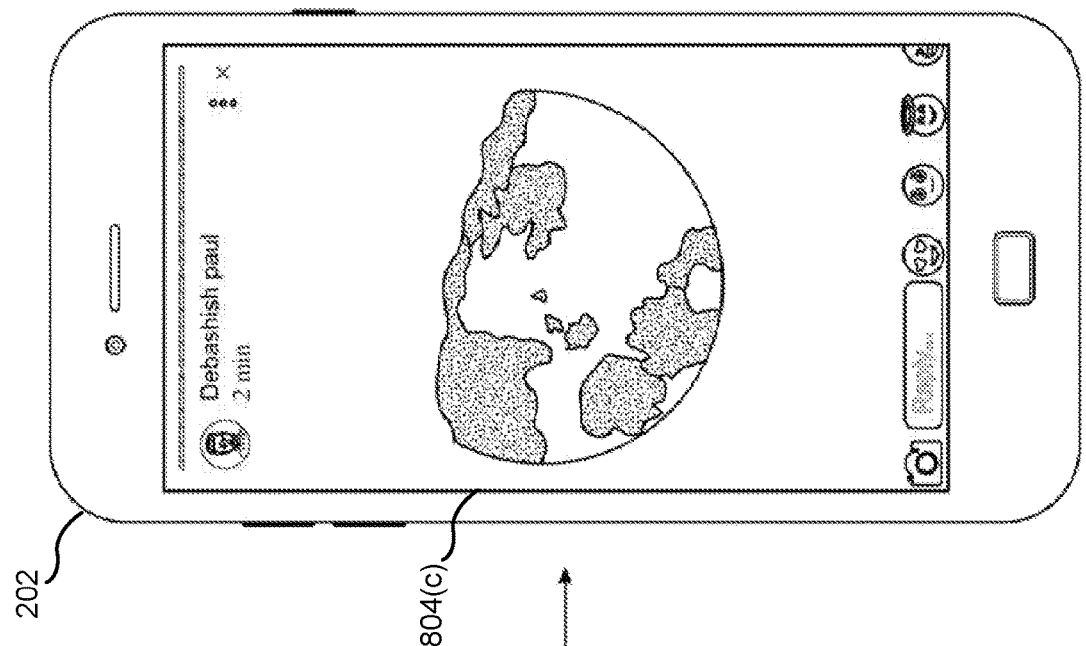
Figure 14C:
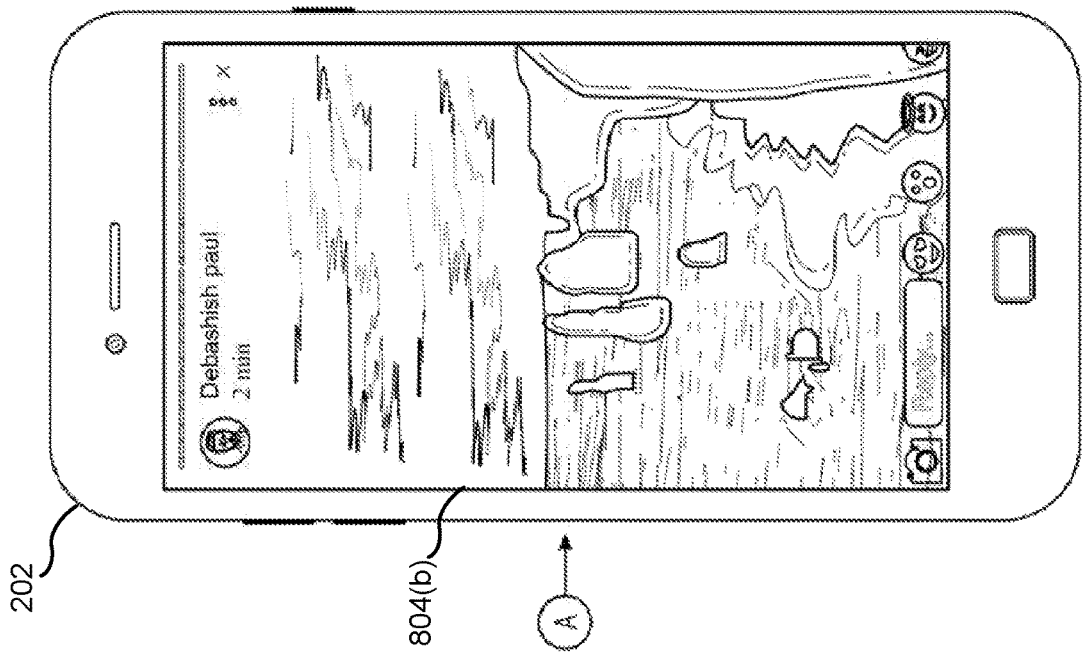

Then, based on the received user content, landing module 212 may create a multi-media newsfeed composition 1300, as illustrated in FIG. 13, that includes media items 804(*a*), 804(*b*), and 804(*c*) in a collage configuration with a caption 1302 that states "London was amazing this time!" Alternatively, landing module 212 may create a multi-media stories composition 1400, as illustrated in FIGS. 14A-14D, which includes a cover page 1402 with the text "London was amazing this time!" (illustrated in FIG. 14A) followed by a display of media item 804(*a*) (illustrated in FIG. 14B), followed by a display of media item 804(*b*) (illustrated in FIG. 14C), followed by a display of media item 804(*c*) (illustrated by FIG. 14D).

In another example, landing module 212 may create a single-media composition. Using FIG. 15A as a specific example, landing module 212 may create a single-media composition 1500 that displays a single photograph and the text "London was amazing this time!" based on content received by landing module 212 from composition landing screen 210.

Figure 15B:
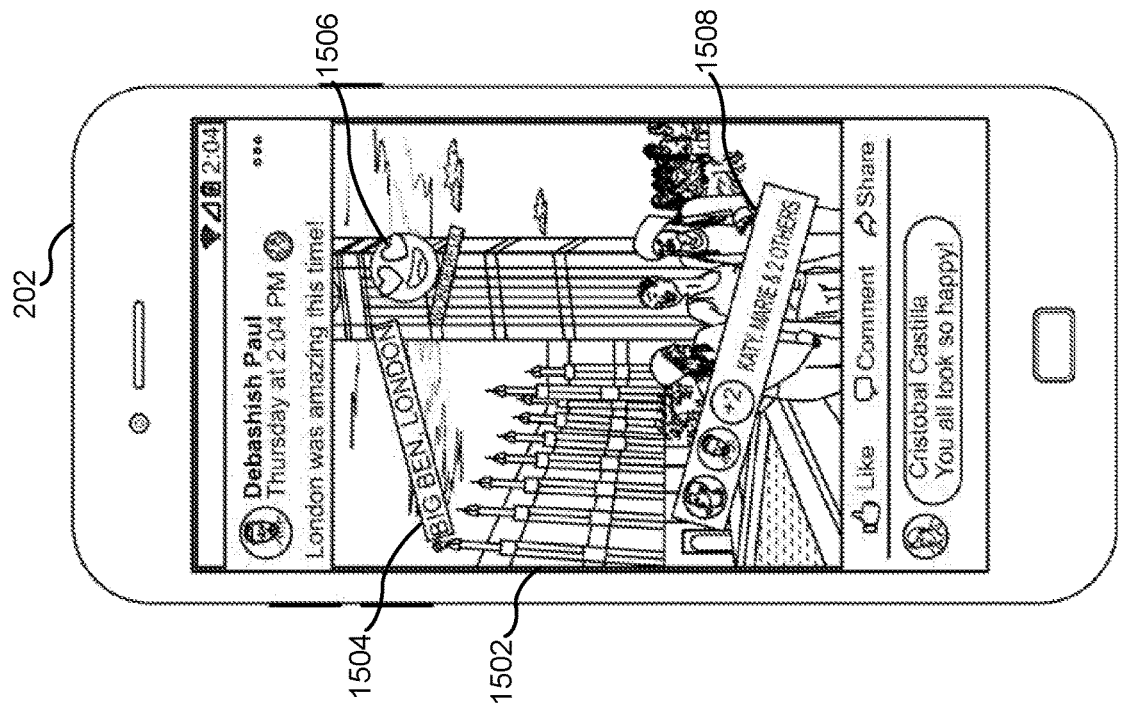
FIGS. 15A-15B are an illustration of additional exemplary newsfeed compositions.
Figure 15A:
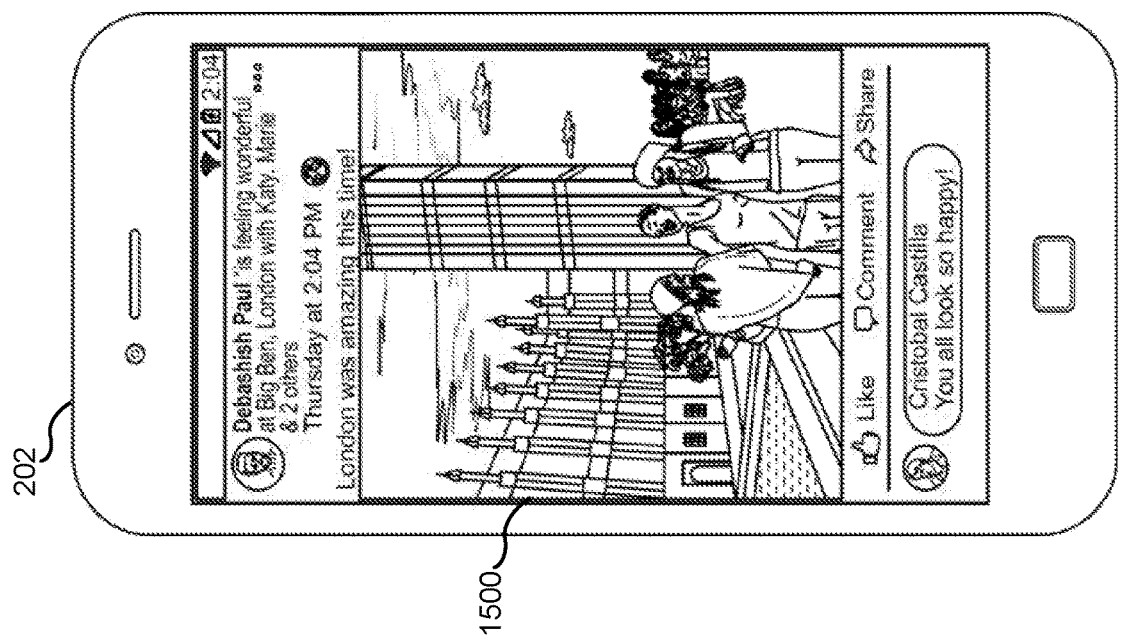

In addition to displaying a media item (e.g., with a text description), the media-based composition created by landing module 212 may include one or more digital stickers that include metadata information (e.g., collected from composition landing screen 210 or an additional metadata screen as described in connection with step 130). Using FIG. 15B as a specific example, single-media composition 1502 may include a location metadata sticker 1504 indicating "Big Ben, London" as the location, a feelings metadata sticker 1506 indicating that the user feels wonderful, and a friends metadata sticker 1508 that tags a list of the user's friends. In some examples, composition landing screen 210 may be used both to create sticker-based compositions (as illustrated in FIG. 15B) and text-based compositions that display the same information displayed in the sticker-based compositions but in a text format (as illustrated in FIG. 15A).

In other examples, landing module 212 may create a text-based composition. For example, landing module 212 may create a text-based composition that includes the text "London was amazing this time!" (based on content received from text space 210(*a*) in FIG. 2 or an additional text-based composition screen such as additional text-based composition screen 1200 in FIG. 12) without including any media items. In some examples, the text-based composition may represent a plain-text composition. In other examples, the text-based composition may represent an SATP composition that includes a background, text-font, text-size, and/or text-color selected by the user, as described above in connection with step 130.

After creating social media composition 218, landing module 212 may post social media composition 218 to one or more consumption channels associated with social media application 206 for other users to consume (e.g., in response to the user selecting posting layer 406 of composition landing screen 210 or a share button on an additional composition screen). For example, landing module 212 may post social media composition 218 to a newsfeed channel and/or a stories channel of the social-networking platform associated with social media application 206. In examples in which the social-networking platform provides multiple consumption channels, landing module 212 may select which consumption channels to use to post a composition based on user input.

As described throughout the instant disclosure, the disclosed systems and methods may provide a composition landing screen that includes, within the same screen, a text area, a media area, and a metadata area that simplifies the composition creation process by reducing a number of user actions required to create a user composition and/or by increasing the number of initial user actions that may be made from an initial screen, relative to traditional systems and methods for creating user compositions on social media platforms. In some examples, the disclosed composition landing screen may include vertically arranged layers (e.g., a text layer, a media layer, a metadata layer, and a posting layer).

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive user input and transform the user input into a digital social media application. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    receiving, via a social media application installed on a user device, user input that triggers a composition creation process to create a social media composition;
    in response to receiving the user input, providing, via a display element of the user device, a composition landing screen, comprising a single application window, that simultaneously presents, as a plurality of arranged layers within the single application window, each of:
        a media space that simultaneously displays (1) a first designated area that includes selectable media items from a camera roll stored by the user device, the selectable media items comprising a subset of media items from the camera roll, wherein each media item within the subset is selected for the first designated area in response to at least one of a determination that the selected media item was most recently shared via the social media application based on a sharing-recency metric or a determination that the selected media item was most often shared via the social media application based on a sharing-frequency metric, and (2) a second designated area that includes a camera element for capturing a live event using a camera of the user device,
        a text space that enables a user to input text to be added to the social media composition,
        a metadata space that displays one or more user-selectable glyphs, each glyph corresponding to a different type of metadata that may be added to the social media composition, and
        a posting space configured to receive user input to post the social media composition;
    receiving, from the simultaneously presented spaces of the composition landing screen, user content comprising media received via the media space, text received via the text space, and metadata corresponding to one or more glyphs selected via the metadata space; and
    in response to receiving user input in the posting space, creating the social media composition based at least in part on the user content received from the simultaneously presented spaces of the composition landing screen.

2. The computer-implemented method of claim 1, wherein the composition landing screen enables the user to create and post social media compositions, comprising text, media, and metadata, using the single application window, without requiring the user to toggle to any additional screen.

3. The computer-implemented method of claim 1, wherein the simultaneously presented spaces are displayed on the composition landing screen as a plurality of vertically arranged layers.

4. The computer-implemented method of claim 1, further comprising:
   after creating the social media composition, collecting subsequent text via the text space of the composition landing screen at a subsequent moment in time;
   determining, at the subsequent moment in time, that the user has submitted user input requesting to post a subsequent social media composition comprising the subsequent text without having submitted any media items via the media space of the composition landing screen; and
   creating a text-based composition comprising the text collected via the text space at the subsequent moment in time.

5. The computer-implemented method of claim 1, wherein the one or more user-selectable glyphs correspond to at least one of:
   location metadata;
   feelings metadata;
   friend metadata;
   weather metadata;
   time metadata; or
   live event metadata.

6. The computer-implemented method of claim 1, wherein the composition creation process is automatically triggered when the social media application is opened on the user device.

7. The computer-implemented method of claim 1, wherein receiving the media via the media space comprises at least one of:
   receiving a selection of one or more media items from the first designated area; or
   receiving a media item captured via the second designated area.

8. The computer-implemented method of claim 7, wherein the media received via the media space comprises at least one of:
   one or more photos; or
   one or more videos.

9. The computer-implemented method of claim 1, wherein the method further comprises, in response to receiving the user input in the posting space, posting the social media composition on a consumption channel associated with the social media application.

10. The computer-implemented method of claim 9, wherein the consumption channel comprises a newsfeed consumption channel.

11. The computer-implemented method of claim 9, wherein the consumption channel comprises a story consumption channel.

12. A system comprising:
   a receiving module, stored in memory of a user device, configured to receive, via a social media application installed on the user device, user input that triggers a composition creation process to create a social media composition;
   a landing module, stored in the memory of the user device, configured to:
      provide, in response to the receiving module receiving the user input, a composition landing screen, comprising a single application window, that simultaneously presents, as a plurality of arranged layers within the single application window, each of:
         a media space that simultaneously displays (1) a first designated area that includes selectable media items from a camera roll stored by the user device, the selectable media items comprising a subset of media items from the camera roll, wherein each media item within the subset is selected for the first designated area in response to at least one of a determination that the selected media item was most recently shared via the social media application based on a sharing-recency metric or a determination that the selected media item was most often shared via the social media application based on a sharing-frequency metric, and (2) a second designated area that includes a camera element for capturing a live event using a camera of the user device,
         a text space that enables a user to input text to be added to the social media composition,
         a metadata space that displays one or more user-selectable glyphs, each glyph corresponding to a different type of metadata that may be added to the social media composition, and
         a posting space configured to receive user input to post the social media composition;
      receive, from the simultaneously presented spaces of the composition landing screen, user content comprising media received via the media space, text received via the text space, and a selection of one or more glyphs received via the metadata space; and
      in response to receiving user input in the posting space, create the social media composition based at least in part on the user content received from the simultaneously presented spaces of the composition landing screen; and
   at least one physical processor configured to execute the receiving module and the landing module.

13. The system of claim 12, wherein the landing module is further configured to post the social media composition on a consumption channel associated with the social media application.

14. The system of claim 13, wherein the consumption channel comprises at least one of:
   a newsfeed consumption channel; or
   a story consumption channel.

15. The system of claim 12, wherein the user submitted the media, text, and metadata using the composition landing screen without being required to toggle between the composition landing screen and any additional screen.

16. The system of claim 15, wherein the composition creation process is automatically triggered when the social media application is opened on the user device.

17. The system of claim 12, wherein the selectable media items comprise at least one of:
   one or more photos; or
   one or more videos.

18. The system of claim 17, wherein the simultaneously presented spaces are displayed on the composition landing screen as a plurality of vertically arranged layers.

19. The system of claim 17, wherein the one or more user-selectable glyphs correspond to at least one of:
- location metadata;
- feelings metadata;
- friend metadata;
- weather metadata;
- time metadata; or
- live event metadata.

20. A non-transitory computer-readable medium comprising one or more computer-executable instructions that, when executed by at least one processor of a computing device, cause the computing device to:
- receive, via a social media application installed on a user device, user input that triggers a composition creation process to create a social media composition;
- in response to receiving the user input, provide, via a display element of the user device, a composition landing screen, comprising a single application window, that simultaneously presents, as plurality of arranged layers within the single application window, each of:
  - a media space that simultaneously displays (1) a first designated area that includes selectable media items from a camera roll stored by the user device, the selectable media items comprising a subset of media items from the camera roll, wherein each media item within the subset is selected for the first designated area in response to at least one of a determination that the selected media item was most recently shared via the social media application based on a sharing-recency metric or a determination that the selected media item was most often shared via the social media application based on a sharing-frequency metric, and (2) a second designated area that includes a camera element for capturing a live event using a camera of the user device,
  - a text space that enables a user to input text to be added to the social media composition,
  - a metadata space that displays one or more user-selectable glyphs, each glyph corresponding to a different type of metadata that may be added to the social media composition, and
  - a posting space configured to receive user input to post the social media composition;
- receive, from the simultaneously presented spaces of the composition landing screen, user content comprising media received via the media space, text received via the text space, and a selection of one or more glyphs received via the metadata space; and
- in response to receiving user input in the posting space, create the social media composition based at least in part on the user content received from the simultaneously presented spaces of the composition landing screen.

* * * * *